US012502682B2

(12) United States Patent
Katsuda

(10) Patent No.: US 12,502,682 B2
(45) Date of Patent: Dec. 23, 2025

(54) LIQUID DELIVERY DEVICE AND LIQUID SPRAY DEVICE

(71) Applicant: SEIKO EPSON CORPORATION, Tokyo (JP)

(72) Inventor: Osamu Katsuda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 516 days.

(21) Appl. No.: 17/658,504

(22) Filed: Apr. 8, 2022

(65) Prior Publication Data

US 2022/0323980 A1 Oct. 13, 2022

(30) Foreign Application Priority Data

Apr. 8, 2021 (JP) ................................ 2021-065801

(51) Int. Cl.
*B05B 9/04* (2006.01)
*B05B 1/08* (2006.01)

(52) U.S. Cl.
CPC ............ *B05B 9/0409* (2013.01); *B05B 1/083* (2013.01)

(58) Field of Classification Search
CPC ..... B05B 9/0409; B05B 1/083; B05B 9/0406; B05B 9/0861; B05B 9/0838; B05B 9/0833; B05B 7/02; B05B 7/12; B05B 7/24; A47K 7/04
See application file for complete search history.

(56) References Cited

U.S. PATENT DOCUMENTS

| | | | | |
|---|---|---|---|---|
| 2003/0088207 | A1* | 5/2003 | Rogatchev | A61M 5/30 2/102 |
| 2012/0163998 | A1 | 6/2012 | Takahashi | |
| 2015/0308421 | A1 | 10/2015 | Vogt | |
| 2020/0316625 | A1* | 10/2020 | Jensen | B05B 9/0883 |
| 2020/0367922 | A1 | 11/2020 | Vogt et al. | |

FOREIGN PATENT DOCUMENTS

| | | | | | |
|---|---|---|---|---|---|
| JP | H10179680 | A | | 7/1998 | |
| JP | 2001041171 | A | * | 2/2001 | |
| JP | 2001271739 | A | | 10/2001 | |
| JP | 2013027589 | A | | 2/2013 | |
| JP | 2014061231 | A | | 4/2014 | |
| JP | 2015226761 | A | | 12/2015 | |
| JP | 2020189084 | A | | 11/2020 | |
| TW | M609581 | U | * | 3/2021 | |
| WO | WO-2016203228 | A1 | * | 12/2016 | A61M 11/007 |

* cited by examiner

*Primary Examiner* — Qingzhang Zhou
(74) *Attorney, Agent, or Firm* — CHIP LAW GROUP

(57) ABSTRACT

A liquid delivery device includes a cylinder having a liquid retention section configured to retain a liquid, a piston configured to change a volume of the liquid retention section, a gas container configured to encapsulate a gas at pressure exceeding atmospheric pressure, a regulator which is coupled to the gas container, and is configured to adjust pressure of the gas delivered from the gas container, a gas flow channel having a supply flow channel configured to supply the gas delivered from the regulator to the piston, and a release-to-atmosphere flow channel configured to release the gas delivered from the regulator to an atmosphere, and a three-way valve provided to the gas flow channel to switch between delivering the gas delivered from the regulator to the supply flow channel and delivering the gas to the release-to-atmosphere flow channel.

9 Claims, 19 Drawing Sheets

LIQUID DELIVERY DEVICE AND LIQUID SPRAY DEVICE

The present application is based on, and claims priority from JP Application Serial Number 2021-065801, filed Apr. 8, 2021, the disclosure of which is hereby incorporated by reference herein in its entirety.

BACKGROUND

1. Technical Field

The present disclosure relates to a liquid delivery device and a liquid spray device.

2. Related Art

In the past, there has been used a liquid delivery device having a variety of configurations. For example, in JP-A-10-179680 (Document 1), there is disclosed a nursing care washing device which makes an inside of the tank for containing a washing liquid high-pressure using a pump mechanism to thereby deliver the washing liquid to a nozzle through a coupling hose, and thus sprays the washing liquid from the nozzle. Further, for example, in JP-A-2001-271739 (Document 2), there is disclosed a nonpulsatile pump as a liquid delivery device which has a triple pump capable of delivering the liquid, and an adjusting pump which operates so as to compensate an ejection flow rate of the triple pump.

However, in the nursing care washing device in Document 1, the pressure inside the tank caused by the pump mechanism is unstable, and the pressure inside the tank dramatically decreases due to the spray of the washing liquid from the nozzle. Therefore, it is difficult for the nursing care washing device in Document 1 to stably deliver the liquid. In contrast, a nonpulsatile pump in Document 2 is complicated in the structure of the triple pump and the adjusting pump used for the nonpulsatile pump, and there is a possibility of incurring growth in size of the device and a rise in cost. Therefore, the present disclosure has an advantage of providing a liquid delivery device which can stably deliver the liquid, and is small in size.

SUMMARY

In view of the problem described above, a liquid delivery device according the present disclosure includes a cylinder having a liquid retention section configured to retain a liquid, a piston configured to change a volume of the liquid retention section, and a gas container configured to encapsulate a gas at pressure exceeding atmospheric pressure, a regulator which is coupled to the gas container, and is configured to adjust pressure of the gas delivered from the gas container, a gas flow channel having a supply flow channel configured to supply the gas delivered from the regulator to the piston, and a release-to-atmosphere flow channel configured to release the gas delivered from the regulator to an atmosphere, and a valve which is provided to the gas flow channel, and which is configured to switch between a first state in which the gas delivered from the regulator is delivered to the supply flow channel, and a second state in which the gas delivered from the regulator is delivered to the release-to-atmosphere flow channel.

Further, in view of the problem described above, another liquid delivery device according the present disclosure includes a cylinder having a liquid retention section configured to retain a liquid, a piston configured to change a volume of the liquid retention section, a gas container configured to encapsulate a gas at pressure exceeding atmospheric pressure, and a displacing section configured to displace the piston with pressure within a predetermined range as much as one stroke corresponding to a predetermined amount of a volume change in the liquid retention section, wherein the piston is configured to automatically stop due to a displacement corresponding to the one stroke by the displacing section.

DESCRIPTION OF AN EXEMPLARY EMBODIMENT

Figure 1:
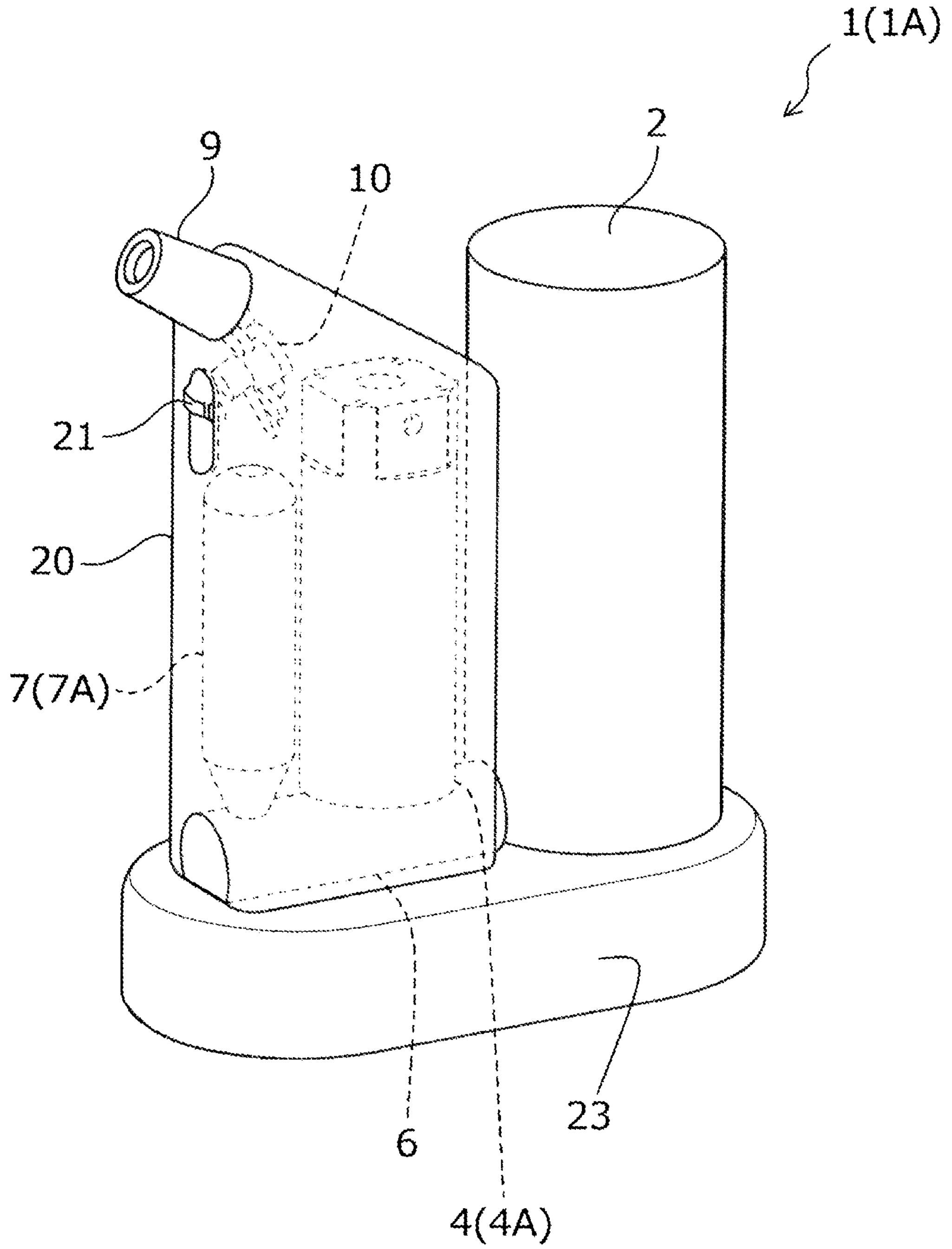
FIG. 1 is a perspective view of a liquid spray device according to Embodiment 1 of the present disclosure.

First, the present disclosure will schematically be described.

In view of the problem described above, a liquid delivery device according a first aspect of the present disclosure includes a cylinder having a liquid retention section configured to retain a liquid, a piston configured to change a volume of the liquid retention section, a gas container configured to encapsulate a gas at pressure exceeding atmospheric pressure, a regulator which is coupled to the gas container, and is configured to adjust pressure of the gas delivered from the gas container, a gas flow channel having a supply flow channel configured to supply the gas delivered from the regulator to the piston, and a release-to-atmosphere flow channel configured to release the gas delivered from the regulator to an atmosphere, and a three-way valve provided to the gas flow channel to switch between delivering the gas delivered from the regulator to the supply flow channel and delivering the gas to the release-to-atmosphere flow channel.

According to the present aspect, it is possible for the regulator to keep the pressure of the gas supplied to the piston from the gas container constant, and it is possible to displace the piston with the constant pressure, and therefore, it is possible to stably deliver the liquid. Further, it is possible to achieve a small-sized simple configuration with the cylinder, the piston, the gas container, the regulator, the gas flow channel, and the three-way valve.

In a liquid delivery device of a second aspect of the present disclosure according to the first aspect, there are further included an inflow port through which the liquid inflows into the liquid retention section, and an outflow port through which the liquid outflows from the liquid retention section.

According to this aspect, there are provided the inflow port through which the liquid inflows into the liquid retention section, and the outflow port through which the liquid outflows from the liquid retention section. Therefore, it is possible to easily make the liquid inflow into the liquid retention section, and at the same time, it is possible to easily make the liquid outflow from the liquid retention section, and thus, it is possible to deliver the liquid with the simple configuration.

In a liquid delivery device of a third aspect of the present disclosure according to the first or second aspect, the piston is configured to stop when the liquid retention section becomes to have a predetermined volume.

According to the present aspect, the piston is configured so as to stop when the liquid retention section becomes to have a predetermined volume. Therefore, the displacement corresponding to one stroke of the piston can accurately be managed, and it is possible to displace the piston with the constant pressure in the displacement corresponding to one stroke of the piston.

In a liquid delivery device of a fourth aspect of the present disclosure according to any one of the first through third aspects, the regulator is adjusted so that a volume change rate of the liquid retention section is no higher than 100 mL/min.

When the volume change rate of the liquid retention section is too high, it becomes difficult to displace the piston with the constant pressure in some cases. However, according to the present aspect, the regulator is adjusted so that the value change rate of the liquid retention section becomes no higher than 100 mL/min. Therefore, it is possible to prevent the volume change rate of the liquid retention section from becoming too high, and thus, it is possible to displace the piston with constant pressure in preferred condition.

In a liquid delivery device of a fifth aspect of the present disclosure according to any one of the first through fourth aspects, the liquid retention section includes a first liquid retention section and a second retention section arranged in series, and the piston changes a volume of the first liquid retention section with a first zoning part, and changes a volume of the second retention section with a second zoning part.

According to this aspect, the first liquid retention section and the second liquid retention section arranged in series are included as the liquid retention section, and the piston changes the volume of the first liquid retention section with the first zoning part, and at the same time, changes the volume of the second liquid retention section with the second zoning part. Therefore, the supply of the liquid to the first liquid retention section and the discharge of the liquid from the second liquid retention section can be performed at the same time, and the supply of the liquid to the second liquid retention section and the discharge of the liquid from the first liquid retention section can be performed at the same time, and thus, it is possible to increase the efficiency in delivering the liquid. Further, it is possible to make the preparation of a plurality of the pistons unnecessary, and it is possible to make the synchronization of the plurality of pistons unnecessary to thereby make the drive control of the piston easy.

In a liquid delivery device of a sixth aspect of the present disclosure according to any one of the first through fifth aspects, the cylinder has the liquid retention section and a gas retention section configured to retain the gas delivered from the gas container, the piston changes a volume of the gas retention section together with the volume of the liquid retention section, and the liquid retention section in the cylinder and the gas retention section in the cylinder are different in diameter from each other.

According to the present aspect, the cylinder diameter is different between the side of supplying the gas and the side of supplying the liquid L. Therefore, it is possible to deliver the liquid with the pressure higher or lower than the gas pressure.

A liquid delivery device according to a seventh aspect of the present disclosure includes a cylinder having a liquid retention section configured to retain a liquid, a piston configured to change a volume of the liquid retention section, and a displacing section configured to displace the piston with pressure within a predetermined range as much as one stroke corresponding to one predetermined volume change of the liquid retention section, wherein the piston is configured to automatically stop due to a displacement corresponding to the one stroke by the displacing section.

According to the present aspect, it is possible to displace the piston as much as one stroke with the pressure within the predetermined range. When adopting the configuration of displacing the piston as much as a plurality of strokes without stopping the piston, there is a possibility that the displacement of the piston becomes unstable, but according to the present aspect, it is possible for the regulator to keep the pressure of the gas supplied to the piston from the gas container constant, and it is possible to displace the piston with the constant pressure, and therefore, it is possible to stably deliver the liquid. Further, it is possible to achieve the small-sized simple configuration with the cylinder, the piston, and the displacing section.

In a liquid delivery device of an eighth aspect of the present disclosure according to the seventh aspect, a moving speed of the piston is adjusted so that a volume change rate of the liquid retention section is no higher than 100 mL/min.

When the volume change rate of the liquid retention section is too high, it becomes difficult to displace the piston with the constant pressure in some cases. However, according to the present aspect, the moving speed of the piston is adjusted so that the value change rate of the liquid retention section becomes no higher than 100 mL/min. Therefore, it is possible to prevent the volume change rate of the liquid retention section from becoming too high, and thus, it is possible to displace the piston with constant pressure in preferred condition.

A liquid spray device according to a ninth aspect of the present disclosure includes the liquid delivery device according to any one of the first through seventh aspects, and a spray nozzle configured to spray the liquid delivered from the liquid delivery device.

According to the present aspect, it is possible to stably supply the liquid to the spray nozzle, and it is possible to stably spray the liquid from the spray nozzle. Further, it is possible to reduce the size of the liquid spray device.

In a liquid spray device of a tenth aspect of the present disclosure according to the ninth aspect, the liquid is delivered to the spray nozzle as a continuous flow, and the continuous flow is changed into a droplet and then ejected by the spray nozzle.

According to the present aspect, the liquid is delivered to the spray nozzle as the continuous flow, and the continuous flow is changed into a droplet and then ejected by the spray nozzle. By adopting such a configuration, it is possible to spray the liquid from the spray nozzle in preferred condition.

In a liquid spray device of an eleventh aspect of the present disclosure according to any one of the first through tenth aspects, a droplet diameter of the droplet is no smaller than 20 μm, and an ejection speed of the droplet is no higher than 300 m/s.

According to the present aspect, the droplet diameter of the droplet is no smaller than 20 μm, and the ejection speed of the droplet is no higher than 300 m/s. By setting the droplet diameter of the droplet and the ejection speed of the droplet in such ranges, it is possible to spray the liquid from the spray nozzle in particularly preferred condition.

Embodiment 1

An embodiment according to the present disclosure will hereinafter be described with reference to the accompanying drawings. Here, a liquid spray device 1 is described as a liquid spray device to a facial skin and so on. It should be noted that it is obvious that the liquid spray device 1 is not limited to one for the facial skin, the liquid spray device 1 can be applied to washing of a skin of, for example, arms, hands, legs, and a back, and can further be applied to washing of an object other than a living body.

First, an outline of the liquid spray device according to the present embodiment will be described with reference to FIG. 1 through FIG. 7. The liquid spray device 1 according to the present embodiment is for washing the skin of a face or the like with liquid L sprayed from a spray nozzle 9. In other words, the liquid spray device 1A according to the present embodiment is a liquid delivery device for delivering the liquid L to the spray nozzle 9, and at the same time, a liquid spray device for spraying the liquid L from the spray nozzle 9.

Figure 2:
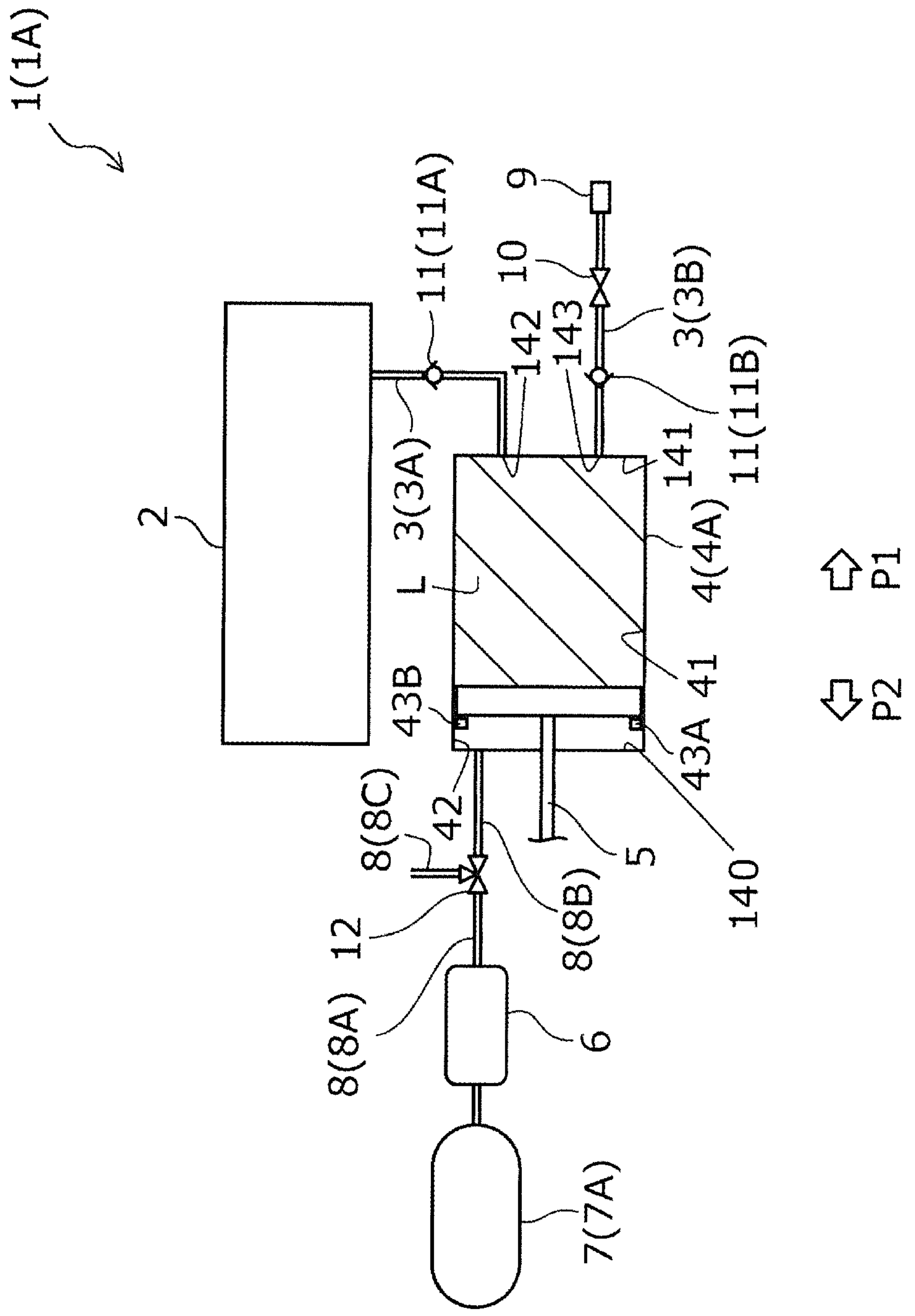
FIG. 2 is a schematic diagram of the liquid spray device according to Embodiment 1 of the present disclosure.

As shown in FIG. 1 and FIG. 2, the liquid spray device 1A is provided with a liquid tank 2 for retaining the liquid L, a cylinder 4 which is supplied with the liquid L from the liquid tank 2, a gas container 7, a regulator 6 to be coupled to the gas container 7 and the cylinder 4, and the spray nozzle 9 which is coupled to the cylinder 4 to spray the liquid L. Here, the liquid tank 2 and the gas container 7 are provided with a configuration in which used ones can easily be replaced with new ones. Further, as shown in FIG. 2, the liquid tank 2 and the cylinder 4 are coupled to each other with a liquid flow channel 3, and the cylinder 4 and the spray nozzle 9 are coupled to each other with the liquid flow channel 3. Here, a gas is encapsulated with pressure exceeding the atmospheric pressure in a gas container 7A in the present embodiment as the gas container 7. It should be noted that any gas such as carbon dioxide, nitrogen, or air can be used as the gas without any limitations, but carbon dioxide can preferably be used.

The liquid flow channel 3 is provided with check valves 11 for preventing the liquid from flowing backward, wherein a liquid flow channel 3A as a part of the liquid flow channel 3 for coupling the liquid tank 2 and the cylinder 4 to each other is provided with a check valve 11A as one of the check valves 11, and a liquid flow channel 3B as a part of the liquid flow channel 3 for coupling the cylinder 4 and the spray nozzle 9 to each other is provided with a check valve 11B as one of the check valves 11. It should be noted that it is possible to adopt a configuration in which a switching operation of an opening and closing valve 10 is used as a substitution for the function of the check valve 11 to omit the check valve 11B. Further, as shown in FIG. 2, the liquid flow channel 3B is provided with the opening and closing valve 10, and by setting a switch 21 provided to a spray unit 20 shown in FIG. 1 to an ON state or an OFF state, it is possible to displace the opening and closing valve 10 to an open state or a closed state, respectively. It should be noted that as the opening and closing valve 10, there can be used any types such as a rotary type, a linear type, or an automatic return type without any limitations.

Further, as shown in FIG. 2, the regulator 6 coupled to the gas container 7 and the cylinder 4 are coupled to each other with a gas flow channel 8. The gas flow channel 8 is provided with a three-way valve 12. The three-way valve 12 is coupled to a gas flow channel 8A, a gas flow channel 8B, and a gas flow channel 8C as the gas flow channel 8, wherein the gas flow channel 8A and the gas flow channel 8B constitute a supply flow channel for supplying the gas delivered from the regulator 6 to a gas retention section 42 in the cylinder 4, and the gas flow channel 8B and the gas flow channel 8C constitute a release-to-atmosphere flow channel for releasing the gas, which has been supplied to the gas retention section 42 from the regulator 6, and which remains in the gas retention section 42, to the atmosphere.

Further, as shown in FIG. 2, a cylinder 4A in the present embodiment as the cylinder 4 has a liquid retention section 41 which is coupled to the liquid flow channel 3A and the liquid flow channel 3B, and can retain the liquid L, and the retention section 42 which is coupled to the gas flow channel 8B, and can retain the gas. Further, a piston 5 movable toward a P1 direction and a P2 direction is inserted into the cylinder 4A, and the piston 5 is configured to be able to change the volumes of the liquid retention section 41 and the gas retention section 42. It should be noted that the gas retention section 42 is provided with a regulation section 43A and a regulation section 43B for regulating a replacement toward the P2 direction of the piston 5 at a predetermined position. It should be noted that it is possible to adopt a configuration in which the regulation section 43A and the regulation section 43B are not disposed, and a wall part 140 at the P2 direction side of the cylinder 4 plays a role of the regulation sections for regulating the displacement toward the P2 direction of the piston 5.

As described above, the liquid spray device 1A in the present embodiment as the liquid delivery device is provided with the cylinder 4 having the liquid retention section 41 for retaining the liquid L, the piston 5 for changing the volume of the liquid retention section 41, the gas container 7 encapsulating the gas under the pressure exceeding the atmospheric pressure, and the regulator 6 which is coupled to the gas container 7 to adjust the pressure of the gas delivered from the gas container 7. Further, the liquid spray device 1A according to the present embodiment is provided with the gas flow channel 8 having the supply flow channel for supplying the gas delivered from the regulator 6 to the gas retention section 42 provided with the piston 5, and the release-to-atmosphere flow channel for releasing the gas, which has been delivered from the regulator 6, and which remains in the gas retention section 42, to the atmosphere, and is further provided with the three-way valve 12 which is provided to the gas flow channel 8, and which switches between a first state in which the gas delivered from the regulator 6 is delivered to the supply flow channel, and a second state in which the gas delivered from the regulator 6 is delivered to the release-to-atmosphere flow channel.

The liquid spray device 1A according to the present embodiment has such a configuration as described above, and can therefore keep the pressure of the gas supplied from the gas container 7 to the gas retention section 42 constant by the regulator 6, and thus it is possible to displace the piston 5 with constant pressure, and therefore, it is possible to stably deliver the liquid L to the spray nozzle 9. In other words, it is possible to deliver the liquid L with a constant load and with the constant pressure. Further, the cylinder 4, the piston 5, the gas container 7, the regulator 6, the gas flow channel 8, and the three-way valve 12 form the small-sized and simple configuration, and further, form the configuration which does not require a power supply, and therefore, form a particularly small-sized and simple configuration. It should be noted that since there is adopted the configuration not requiring the power supply, the concern for safety of the user due to the ground leakage disappears.

Further, as shown in FIG. 2, in the liquid spray device 1A according to the present embodiment, the cylinder 4A is provided with an inflow port 142 and an outflow port 143 in a wall part 141 at the P1 direction side, wherein the liquid L flows into the liquid retention section 41 from the liquid tank 2 through the inflow port 142, and the liquid L flows out to the spray nozzle 9 from the liquid retention section 41 through the outflow port 143. Therefore, it is possible for the liquid spray device 1A according to the present embodiment to easily make the liquid L flow into the liquid retention section 41, and at the same time, easily make the liquid L flow out from the liquid retention section 41, and thus, it is made possible to deliver the liquid L from the liquid tank 2 to the spray nozzle 9 with a simple configuration. It should be noted that when the inflow port 142 and the outflow port 143 are disposed in the immediate vicinity of a sidewall having contact with the wall part 141, substantially the same function is obtained.

Further, as shown in FIG. 2, in the liquid spray device 1A according to the present embodiment, the piston 5 is limited in the displacement range by making contact with the wall part 141 in the P1 direction, and is limited in the displacement range in the P2 direction by making contact with the regulation section 43A and the regulation section 43B. In other words, in the liquid spray device 1A according to the present embodiment, there is adopted the configuration in which the piston 5 makes contact with the regulation section 43A and the regulation section 43B to stop when the volume of the liquid retention section 41 reaches a predetermined value. Therefore, in the liquid spray device 1A according to the present embodiment, the displacement corresponding to one stroke of the piston 5 can accurately be managed, and it is made possible to displace the piston 5 with the constant pressure in the displacement corresponding to one stroke of the piston 5. In other words, it is possible to deliver the liquid L with a constant load and with the constant pressure. It should be noted that the "displacement corresponding to one stroke of the piston 5" corresponds to a single displacement of the piston 5 from a regulation position at the P2 direction side regulated by the regulation section 43A and the regulation section 43B to a regulation position at the P1 direction side regulated by the wall part 141.

In other words, the liquid spray device 1A according to the present embodiment is provided with the cylinder 4A having the liquid retention section 41 for retaining the liquid L, the piston 5 for changing the volume of the liquid retention section 41, and the regulator 6 as a displacement section for displacing the piston 5 as much as one stroke corresponding to a single predetermined volume change of the liquid retention section 41 with the pressure within a predetermined range. Further, the piston 5 is provided with a configuration of automatically stopping due to the displacement corresponding to one stroke with the pressure of the gas from the regulator 6.

As described above, it is possible for the liquid spray device 1A according to the present embodiment to displace the piston 5 as much as one stroke with the pressure in the predetermined range. When adopting the configuration of displacing the piston 5 as much as a plurality of strokes without stoppage, there is a possibility that the displacement of the piston 5 becomes unstable, but the liquid spray device 1A according to the present embodiment can keep the pressure of the gas supplied from the gas container 7 to the gas retention section 42 constant by the regulator 6, and thus it is possible to displace the piston 5 with the constant pressure, and therefore, it is possible to stably deliver the liquid L to the spray nozzle 9 from the liquid tank 2. Further, the liquid spray device 1A according to the present embodiment can be made to have a small-sized simple configuration with the cylinder 4A, the piston 5, and the regulator 6 as shown in FIG. 1 and so on.

It should be noted that in the liquid spray device 1A according to the present embodiment, the regulator 6 is adjusted so that the volume change rate of the liquid retention section 41 becomes no higher than 100 mL/min. In other words, in the liquid spray device 1A according to the present embodiment, the moving speed of the piston 5 is adjusted so that the volume change rate of the liquid retention section 41 becomes no higher than 100 mL/min. When the volume change rate of the liquid retention section 41 is too high, it becomes difficult to displace the piston 5 with the constant pressure in some cases. However, by adjusting the regulator 6 so that the volume change rate of the liquid retention section 41 becomes no higher than 100 mL/min, it is possible to prevent the volume change rate of the liquid retention section 41 from becoming too high, and thus, it is possible to displace the piston 5 with the constant pressure in preferred condition.

Figure 3:
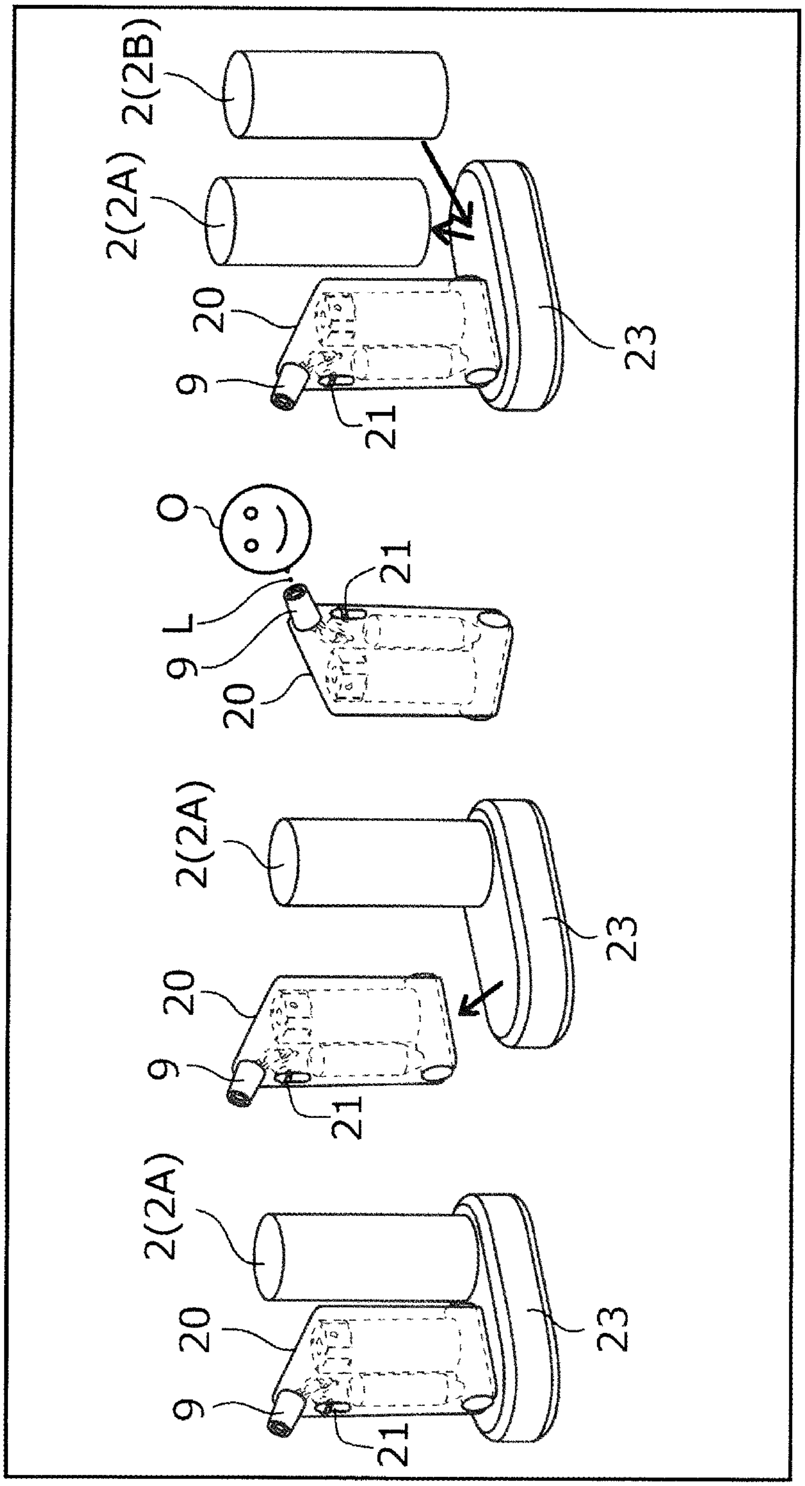
FIG. 3 is a schematic flowchart for describing attachment and detachment of constituents of the liquid spray device according to Embodiment 1 of the present disclosure.

Then, attachment and detachment of the constituents of the liquid spray device 1A according to the present embodiment will be described with reference to FIG. 3. The leftmost diagram in FIG. 3 is a diagram corresponding to FIG. 1, and shows a state in which, for example, the spray unit 20 and the liquid tank 2 have been set on a pedestal 23, and the liquid L has been supplied to the spray unit 20. Further, the spray unit 20 can be detached from the pedestal 23 as shown in the second left diagram in FIG. 3 from the state shown in the leftmost diagram in FIG. 3. Further, as shown in the third left diagram in FIG. 3, it is possible for the user to spray the liquid L from the spray nozzle 9 toward an object O such as the facial skin by setting the switch 21 to the ON state using the spray unit 20 having been detached from the pedestal 23. Further, as shown in the rightmost diagram in FIG. 3, it is possible for the user to set the spray unit 20 on the pedestal 23 once again, and replace a liquid tank 2A as the liquid tank 2 having ever been used with a liquid tank 2B as a new liquid tank 2 when the liquid L run out in the liquid tank 2A.

It should be noted that when spraying the liquid L from the spray unit 20, it is possible to adopt a configuration in which the liquid L from the spray nozzle 9 is sprayed by the user setting the switch 21 to the ON state, and the spray of the liquid L from the spray nozzle 9 is stopped by the user setting the switch 21 to the OFF state. However, such a configuration is not a limitation, and it is possible to adopt a configuration in which the spray of the liquid L from the spray nozzle 9 is automatically stopped, for example, after elapse of a predetermined time without the user manually setting the switch 21 to the OFF state. Further, when adopting such a configuration, it is possible to adopt a configuration in which the switch 21 is automatically set to the OFF state due to an operation of setting the spray unit 20 on the pedestal 23 once again. Further, it is possible to adopt the configuration in which the liquid L is automatically supplied to the liquid retention section 41 from the liquid tank 2 due to the operation of setting the spray unit 20 on the pedestal 23 once again, but it is possible to adopt a configuration in which the liquid L is supplied to the liquid retention section 41 from the liquid tank 2 due to the user setting a switch nor shown or the like to the ON state.

Then, an operating principle due to the liquid delivery of the liquid L in the liquid spray device 1A according to the present embodiment will be described with reference to FIG. 4, and FIG. 5 through FIG. 7. The diagram at an upper left side in FIG. 4 corresponds to FIG. 5, and shows the state in which the liquid L is supplied to the liquid retention section 41. Here, it is assumed that, for example, carbon dioxide at 6 MPa (mega Pascal) is retained in a gas retention section 71 in the gas container 7, and the regulator 6 is adjusted so that force is applied to the piston 5 with the gas pressure of 0.8 MPa.

Figure 4:
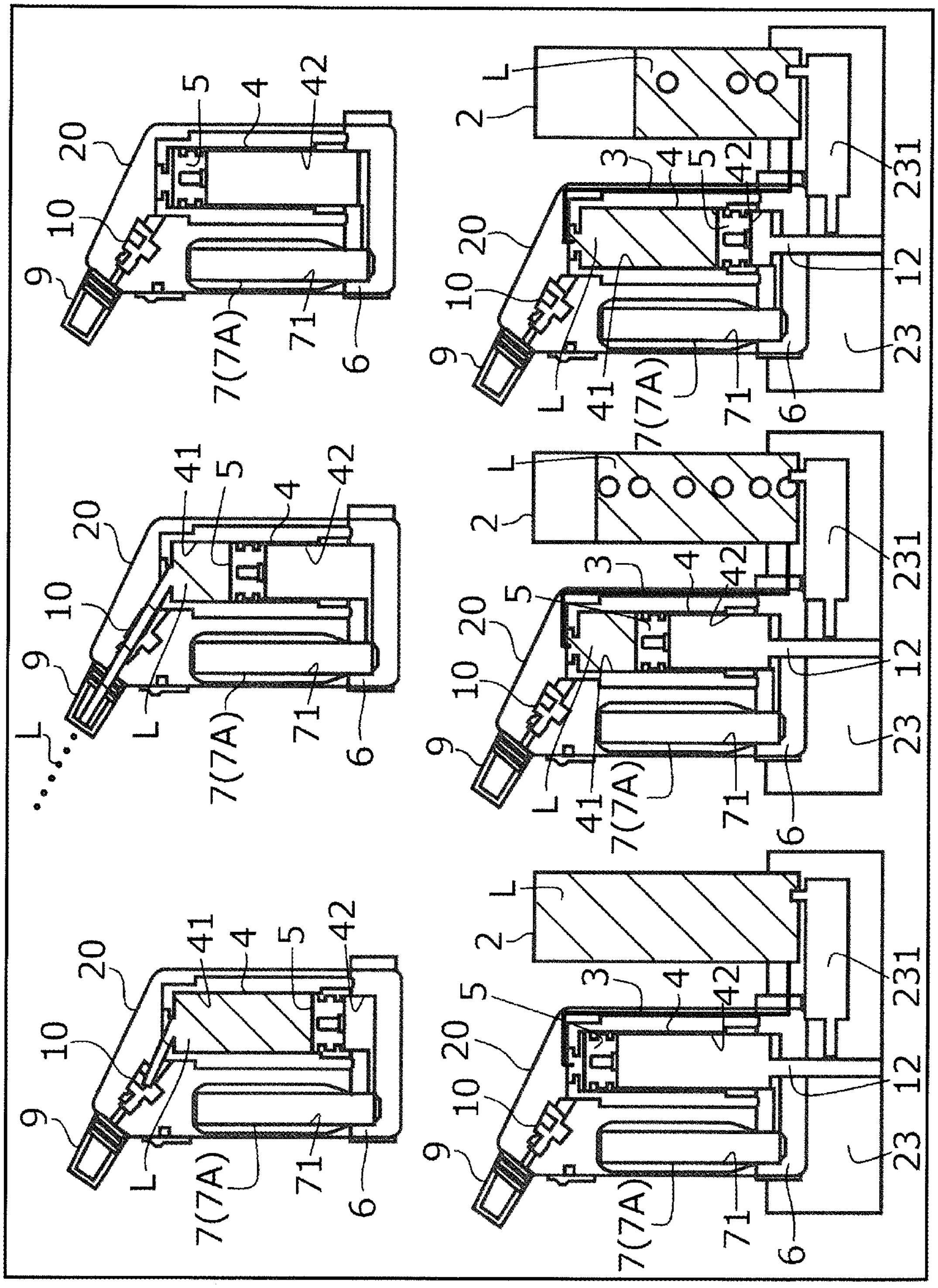
FIG. 4 is a schematic diagram for explaining an operating principle of the liquid spray device according to Embodiment 1 of the present disclosure.
Figure 5:
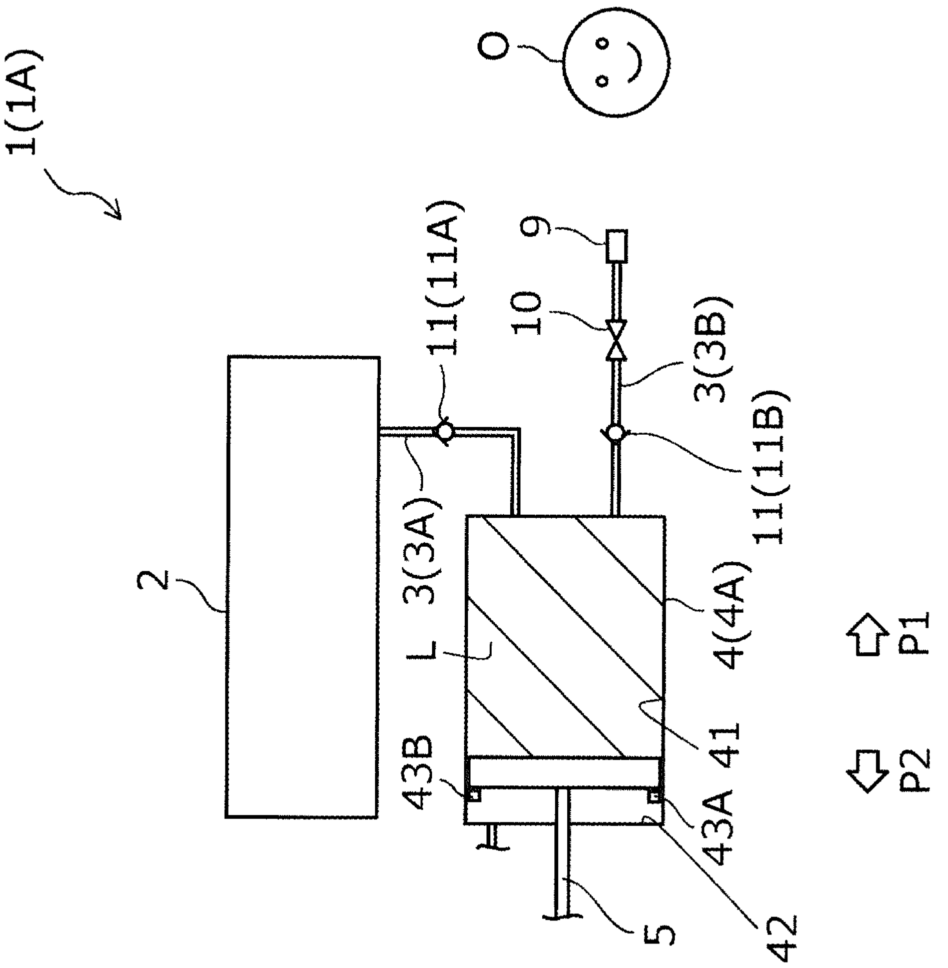
FIG. 5 is a schematic diagram for explaining a liquid delivery procedure of the liquid spray device according to Embodiment 1 of the present disclosure, and is a diagram showing a state in which a liquid is supplied in a cylinder.
Figure 6:
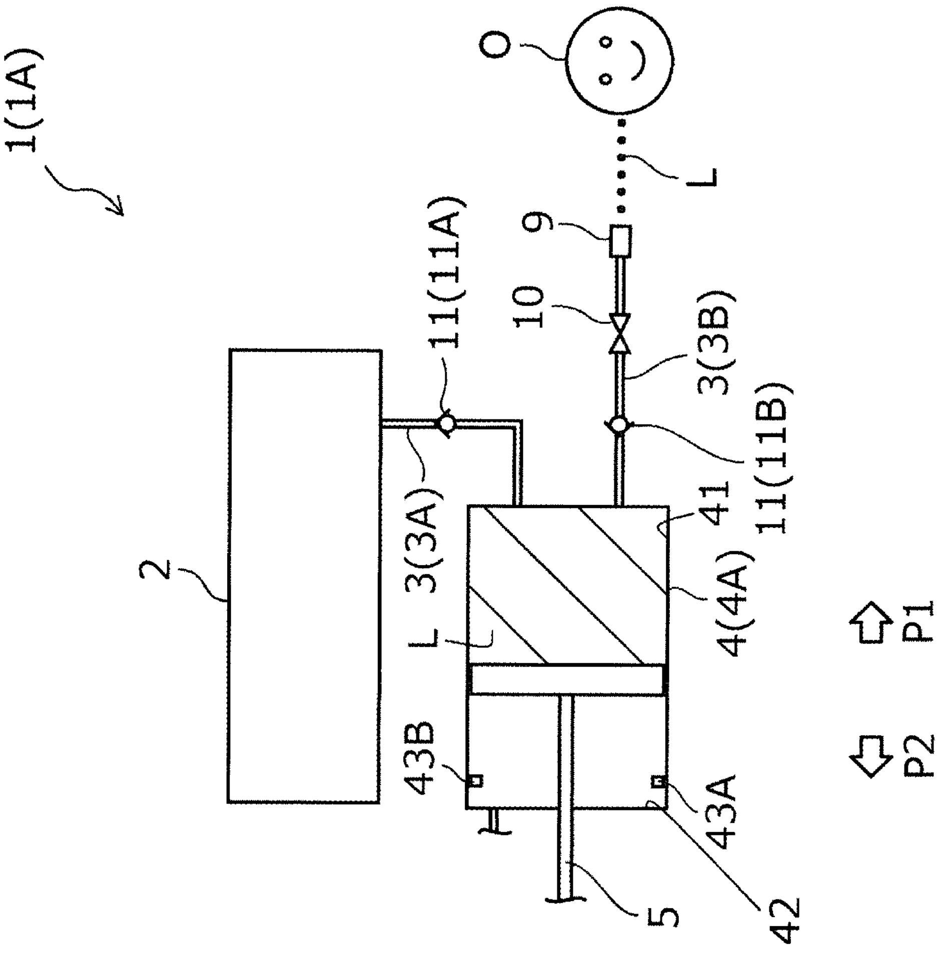
FIG. 6 is a schematic diagram for explaining the liquid delivery procedure of the liquid spray device according to Embodiment 1 of the present disclosure, and is a diagram showing a state in which the liquid is sprayed from a spray nozzle.

The diagram at the upper center in FIG. 4 corresponds to FIG. 6, and shows the state in which the liquid L is sprayed from the spray nozzle 9. By the user manually setting the switch 21 to the ON state, the opening and closing valve 10 is set to the open state, and the piston 5 is pushed with the gas pressure of 0.8 MPa to thereby apply the force of 0.8 MPa to the liquid retention section 41, and the liquid L is sprayed from the spray nozzle 9 via the opening and closing valve 10.

It should be noted that in the liquid spray device 1A according to the present embodiment, the liquid L is delivered to the spray nozzle 9 as a continuous flow, and the liquid L fed to the spray nozzle 9 as the continuous flow is changed into a droplet and then ejected by the spray nozzle 9. By adopting such a configuration, it is possible to spray the liquid L from the spray nozzle 9 in preferred condition.

Here, it is preferable for the droplet to be ejected from the spray nozzle 9 to have the droplet diameter no smaller than 20 μm, and have an ejection speed no lower than 300 m/s. The reason is that by setting the droplet diameter of the droplet and the ejection speed of the droplet in such ranges, it is possible to spray the liquid L from the spray nozzle 9 in particularly preferred condition.

Figure 7:
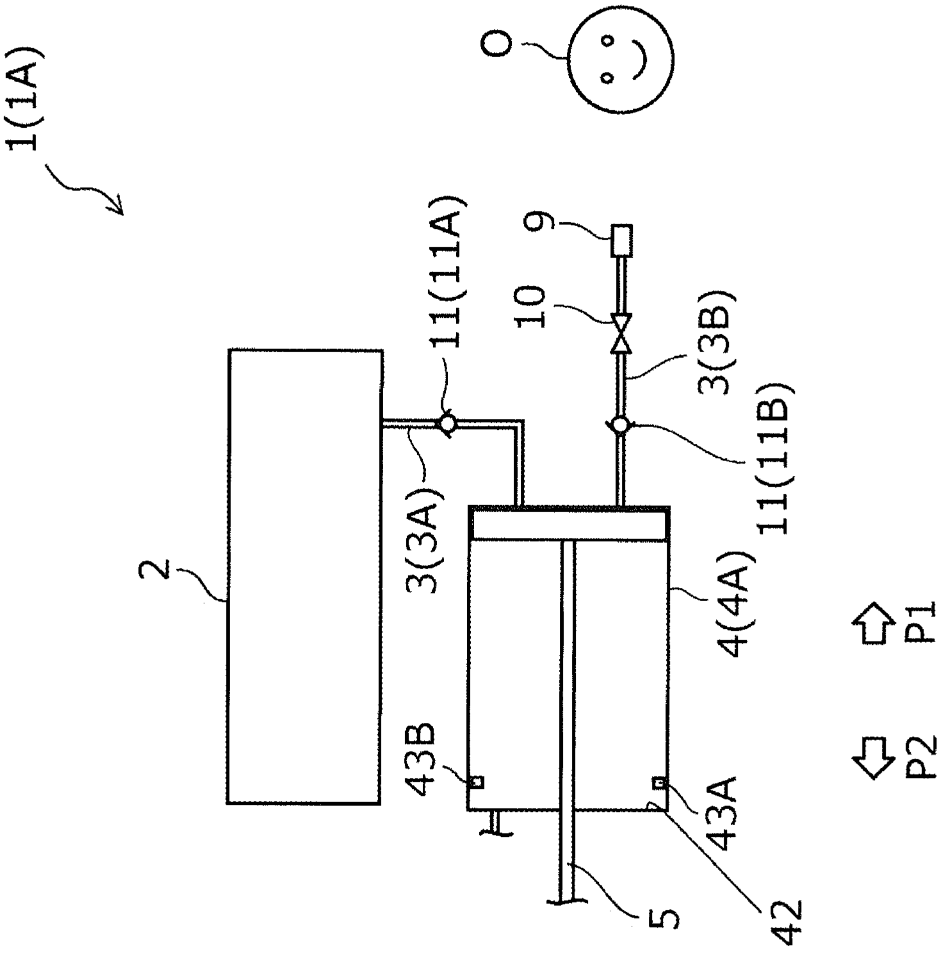
FIG. 7 is a schematic diagram for explaining the liquid delivery procedure of the liquid spray device according to Embodiment 1 of the present disclosure, and is a diagram showing a state in which the liquid corresponding to one stroke has been sprayed from the spray nozzle, and a state in which the liquid has not been supplied in the cylinder.

The diagram at an upper right side in FIG. 4 corresponds to FIG. 7, and shows the state in which the liquid L has finished being sprayed from the spray nozzle 9. In this state, in the gas retention section 42 of the cylinder 4, there exists carbon dioxide with the gas pressure of 0.8 MPa.

The diagram at a lower left side in FIG. 4 shows a state in which the spray unit 20 is set on the pedestal 23 once again. Further, there is shown a state in which the gas flow channel 8B and the gas flow channel 8C are connected to each other with the three-way valve 12 to release carbon dioxide as the gas in the gas flow channel 8 to the atmosphere.

It should be noted that the liquid spray device 1A according to the present embodiment is provided with a pressurizing section 231 for retaining a compressed gas such as carbon dioxide on the pedestal 23 as shown in the diagram at a lower left side in FIG. 4, the diagram at the lower center in FIG. 4, and the diagram at a lower right side in FIG. 4. Further, the transition from the diagram at the lower left side in FIG. 4 to the state of the diagram at the lower center in FIG. 4 is made, and further, the transition to the state of the diagram at the lower right side in FIG. 4 is made. In other words, by pressurizing at, for example, 0.2 MPa inside the liquid tank 2 by the pressurizing section 231, the liquid L is supplied to the liquid retention section 41 from the liquid tank 2 via the liquid flow channel 3.

Embodiment 2

Then, a liquid spray device 1B according to Embodiment 2 as the liquid spray device 1 will be described with reference to FIG. 8 and FIG. 9. It should be noted that in FIG. 8 and FIG. 9, constituents common to the present embodiment and Embodiment 1 described above are denoted by the same reference numerals, and the detailed description thereof will be omitted. Here, the liquid spray device 1B according to the present embodiment has substantially the same features as those of the liquid spray device 1A according to Embodiment 1 described above except the following descriptions.

Figure 8:
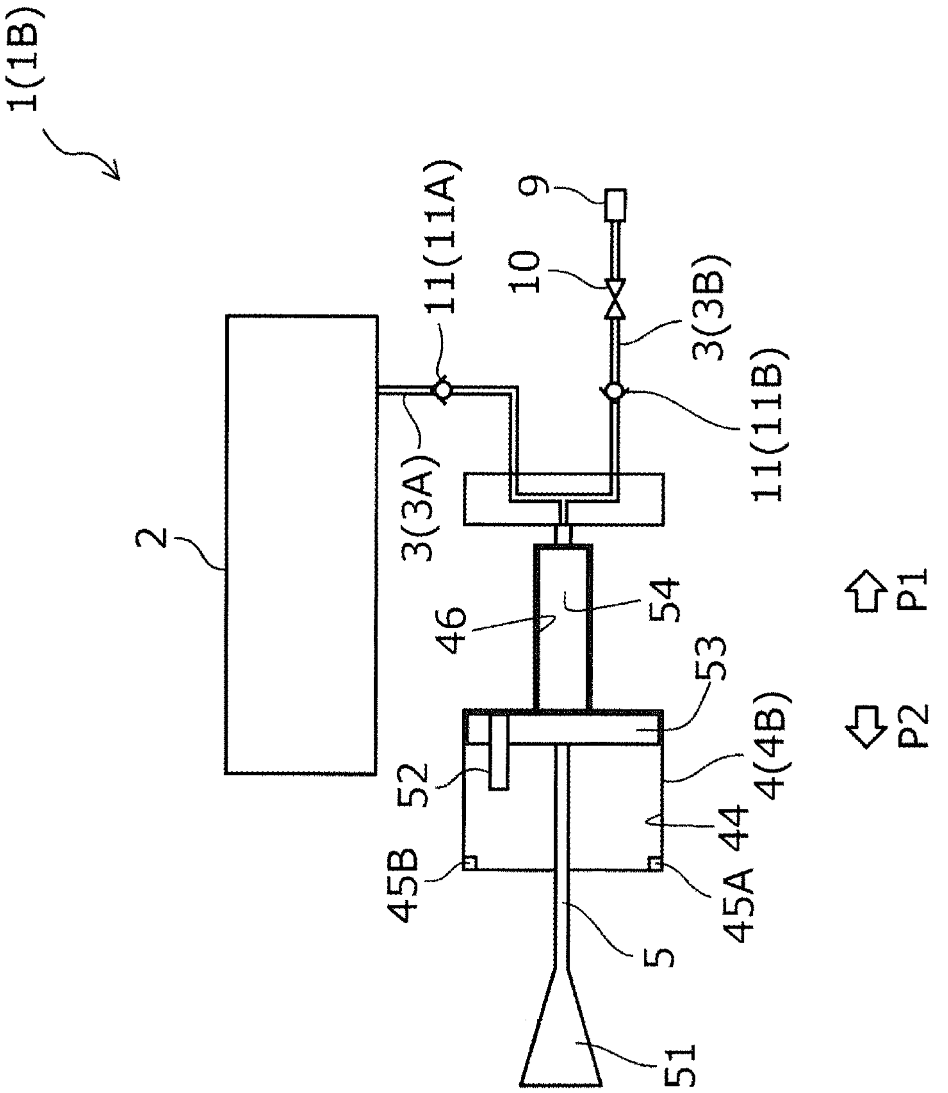
FIG. 8 is a schematic diagram of a liquid spray device according to Embodiment 2 of the present disclosure, and is a diagram showing a state in which the liquid has not been supplied in the cylinder.
Figure 9:
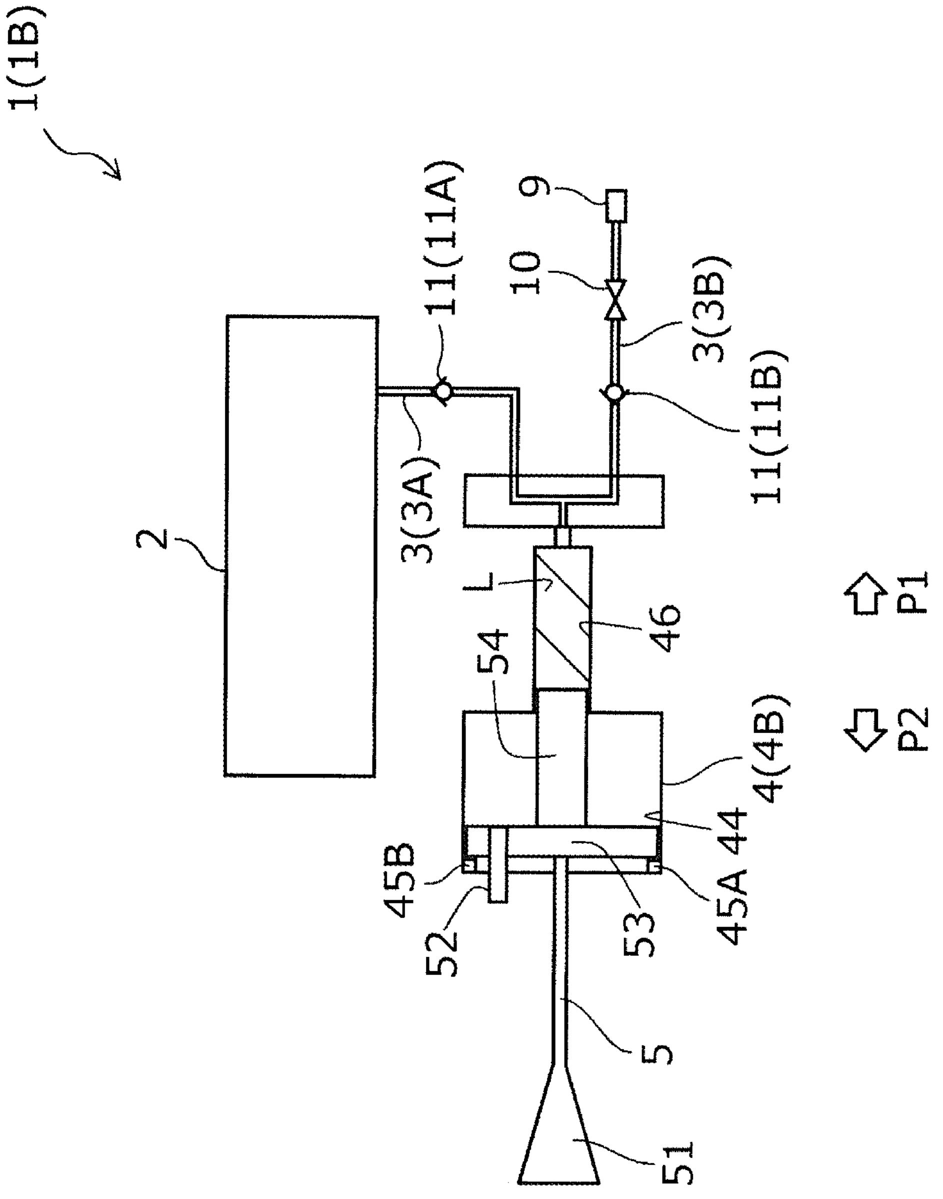
FIG. 9 is a schematic diagram of the liquid spray device according to Embodiment 2 of the present disclosure, and is a diagram showing a state in which the liquid is supplied in the cylinder.

As shown in FIG. 8 and FIG. 9, the liquid spray device 1B according to the present embodiment is provided with a cylinder 4B having a large cylinder section 44 and a small cylinder section 46 as the cylinder 4. It should be noted that the large cylinder section 44 is provided with a regulation section 45A and a regulation section 45B for regulating a replacement toward the P2 direction of the piston 5 at a predetermined position. Further, in the liquid spray device 1B according to the present embodiment, the piston 5 is provided with a lever 51 to be gripped by the user with a hand, a check valve 52 having a non-return valve, a large-diameter part 53 corresponding to the large cylinder section 44, and a small-diameter part 54 corresponding to the small cylinder section 46.

Since the liquid spray device 1B according to the present embodiment has such a configuration as described above, the user grips the lever 51 to displace the piston 5 toward the P2 direction to thereby displace the piston 5 from the state shown in FIG. 8 to the state shown in FIG. 9, and thus, the liquid L is supplied to the small cylinder section 46. In other words, the small cylinder section 46 corresponds to the liquid retention section 41 of the liquid spray device 1A according to Embodiment 1. It should be noted that in the state shown in FIG. 9, the large cylinder section 44 is provided with a substantially vacuum state.

Further, by the user disengaging a hand from the lever 51, the piston 5 is displaced toward the P1 direction. In other words, the piston 5 makes the transition from the state shown in FIG. 9 to the state shown in FIG. 8 once again. Due to the displacement of the piston 5 toward the P1 direction, the liquid L is fed from the small cylinder section 46 toward the spray nozzle 9, and at the same time, the droplet of the liquid L is ejected from the spray nozzle 9. It should be noted that in the displacement of the piston 5 toward the P1 direction, namely in the displacement of the piston 5 corresponding to one stroke, the moving speed of the piston 5 becomes substantially constant.

As described above, the liquid spray device 1B according to the present embodiment has the configuration in which the user grips the lever 51 to displace the piston 5. It should be noted that it is possible to adopt, for example, a configuration of displacing the lever 51 using a ball screw, or a configuration of winding a wire to thereby displace the lever 51 instead of the configuration in which the user grips the lever 51 to displace the piston 5. Further, it is possible to adopt a configuration provided with a pump for enhancing the degree of vacuum in the large cylinder section 44 and so on in the state shown in FIG. 9. For example, it is possible to adopt a configuration in which a three-way valve capable of switching the flow channel to the atmosphere or a vacuum pump is used as the check valve 52, and when displacing the piston 5 toward the P2 direction, the large cylinder section 44 is set to the state in which the load by the atmospheric pressure is low to displace the piston 5 to the regulation section 45, and then, the reduction in pressure is performed with the vacuum pump to increase the driving force toward the P1 direction.

As described above, the liquid spray device 1B according to the present Embodiment is also provided with the cylinder 4B having the small cylinder section 46 as the liquid retention section for retaining the liquid L, and the piston 5 for changing the volume of the small cylinder section 46. Further, there is provided the configuration in which it is possible to displace the piston 5 as much as one stroke corresponding to the single predetermined volume change of the small cylinder section 46 with the pressure within the predetermined range, and at the same time, it is possible to automatically stop the piston 5 due to the displacement corresponding to one stroke. It should be noted that the lever 51 and the check valve 52 can be assumed to play the role of the displacement section for displacing the piston 5 with the pressure within the predetermined range.

Embodiment 3

Then, a liquid spray device 1C according to embodiment 3 as the liquid spray device 1 will be described with reference to FIG. 10. It should be noted that in FIG. 10, constituents common to the present embodiment and Embodiment 1 and Embodiment 2 described above are denoted by the same reference numerals, and the detailed description thereof will be omitted. Here, the liquid spray device 1C according to the present embodiment has substantially the same features as those of the liquid spray device 1A according to Embodiment 1 described above except the following descriptions.

Figure 10:
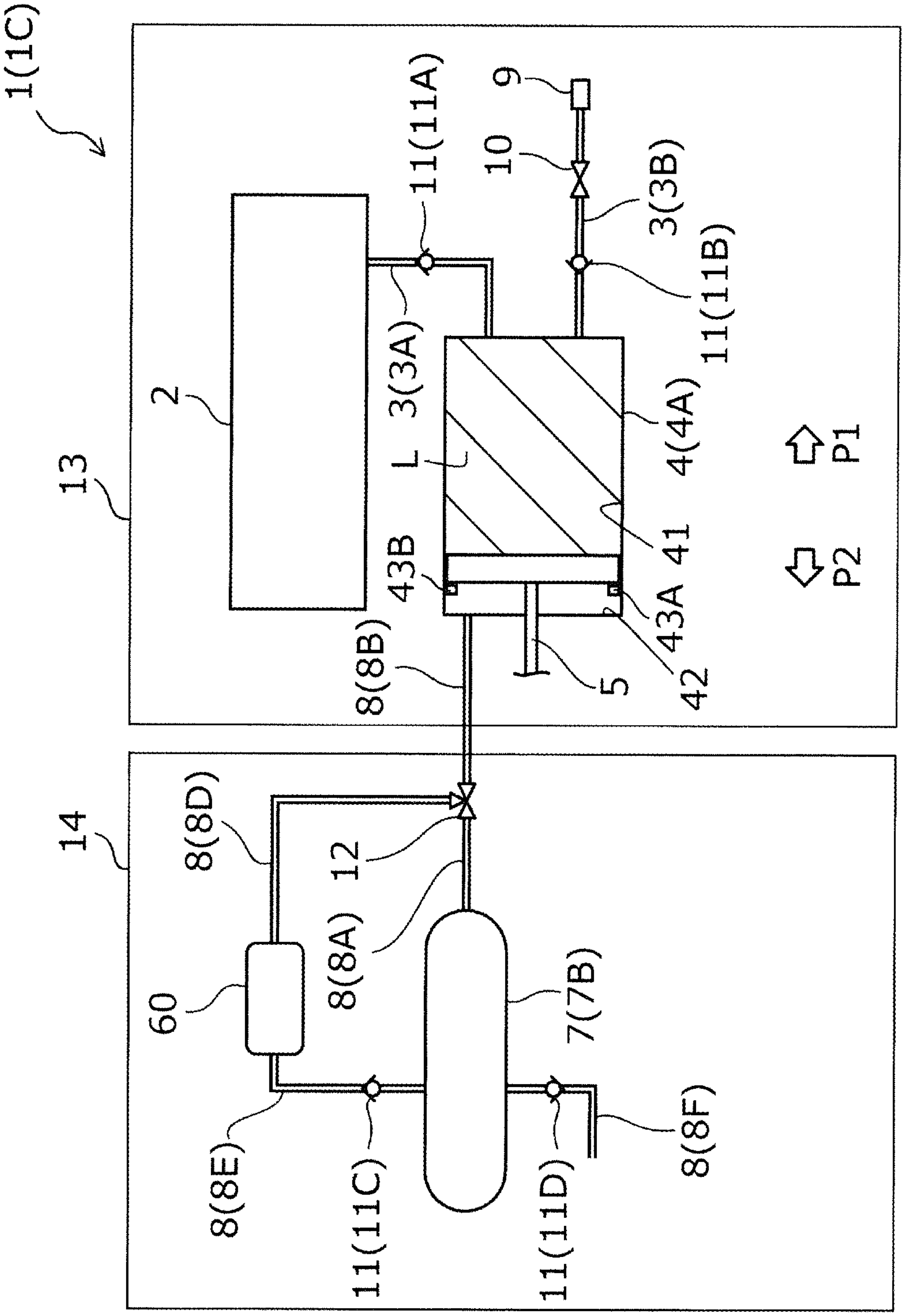
FIG. 10 is a schematic diagram of a liquid spray device according to Embodiment 3 of the present disclosure.

As shown in FIG. 10, the liquid spray device 1C according to the present Embodiment is provided with a main body section 13 having the liquid tank 2, the cylinder 4, the piston 5, and the spray nozzle 9, and a gas supply section 14 having a compressor 60 and the gas container 7. The configuration of each of the constituents of the main body section 13 is substantially the same as the configuration of corresponding one of the constituents of the liquid spray device 1A according to Embodiment 1. In contrast, in the gas supply section 14, the three-way valve 12 is coupled to a gas container 7B as the gas container 7 via the gas flow channel 8A, and is coupled to the compressor 60 via a gas flow channel 8D. Further, the compressor 60 is coupled to the gas container 7B with a gas flow channel 8E provided with a check valve 11C. Further, the gas container 7B is coupled to a gas flow channel 8F which is provided with a check valve 11D, and is capable of increasing the pressure in the gas container 7B from the outside.

The liquid spray device 1C according to the present embodiment is provided with the gas supply section 14 having such a configuration, and is therefore capable of retaining the compressed air in the gas container 7B with the compressor 60. Further, it is possible to deliver the liquid L corresponding to one stroke from the liquid tank 2 to the spray nozzle 9 with substantially constant pressure similarly to the liquid spray device 1A according to Embodiment 1 using the compressed air retained in the gas container 7B. It should be noted that the compressed air retained in the gas container 7B can be provided with the pressure of, for example, 0.8 MPa.

Embodiment 4

Then, a liquid spray device 1D according to Embodiment 4 as the liquid spray device 1 will be described with reference to FIG. 11. It should be noted that in FIG. 11, constituents common to the present embodiment and embodiment 1 through Embodiment 3 described above are denoted by the same reference numerals, and the detailed description thereof will be omitted. Here, the liquid spray device 1D according to the present embodiment has substantially the same features as those of the liquid spray device 1A according to Embodiment 1 described above except the following descriptions.

Figure 11:
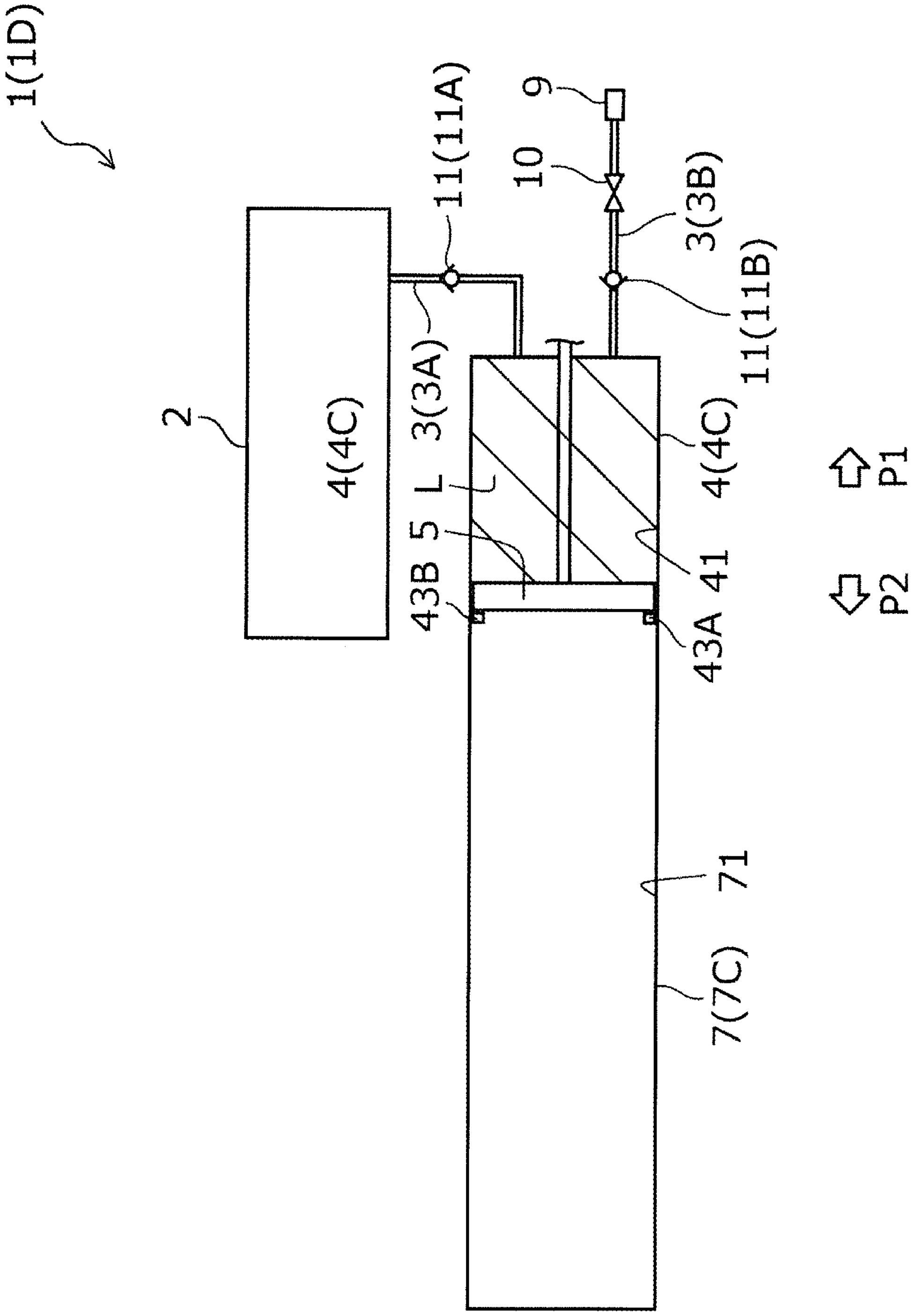
FIG. 11 is a schematic diagram of a liquid spray device according to Embodiment 4 of the present disclosure.

As shown in FIG. 11, in the liquid spray device 1D according to the present embodiment, a cylinder 4C as the cylinder 4 and a gas container 7C as the gas container 7 are integrally configured. It is possible to retain the compressed air at, for example, 0.8 MPa in the gas retention section 71 of the gas container 7C. Further, for example, by the user manually displacing the piston 5 toward the P2 direction up to the position regulated by the regulation section 43A and the regulation section 43B as shown in FIG. 11, and then the user releasing the hand from the piston 5, it is possible to deliver the liquid L corresponding to one stroke with substantially constant pressure from the liquid tank 2 to the spray nozzle 9. It should be noted that it is possible to adopt a configuration in which the piston 5 is displaced with electric power to the position regulated by the regulation section 43A and the regulation section 43B.

Embodiment 5

Then, a liquid spray device 1E according to Embodiment 5 as the liquid spray device 1 will be described with reference to FIG. 12. It should be noted that in FIG. 12, constituents common to the present embodiment and Embodiment 1 through Embodiment 4 described above are denoted by the same reference numerals, and the detailed description thereof will be omitted. Here, the liquid spray device 1E according to the present embodiment has substantially the same features as those of the liquid spray device 1A according to Embodiment 1 described above except the following descriptions.

Figure 12:
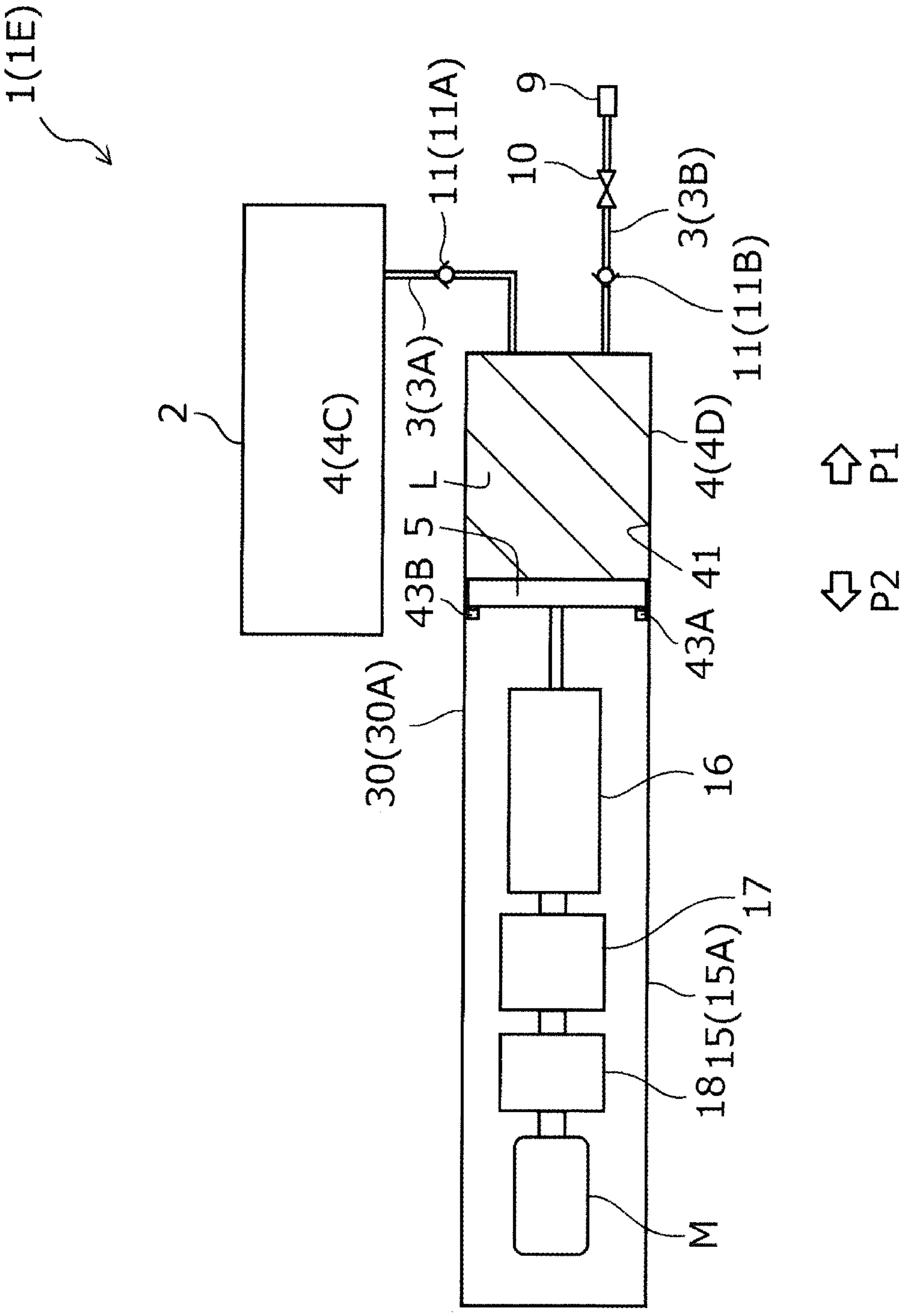
FIG. 12 is a schematic diagram of a liquid spray device according to Embodiment 5 of the present disclosure.

As shown in FIG. 12, the liquid spray device 1E according to the present embodiment is provided with a case 30A as a case 30 in which a cylinder 4D as the cylinder 4 and a drive unit 15A as a drive unit 15 are integrally configured. The drive unit 15A is provided with a ball screw 16 to be coupled to the piston 5, a motor M, and a torque limiter 18 and a reduction gear 17 to be coupled to the motor M. Due to such a configuration, the liquid spray device 1E according to the present embodiment is capable of driving the ball screw 16 via the torque limiter 18, and is capable of displacing the piston 5 with a constant force. In other words, it is possible to deliver the liquid L corresponding to one stroke with substantially constant pressure from the liquid tank 2 to the spray nozzle 9.

It should be noted that it is possible for the user to manually drive the ball screw 16 instead of driving the ball screw 16 with the motor M via the torque limiter 18. Further, it is possible to make the reduction ratio by the reduction gear 17 different between when displacing the piston 5 toward the P2 direction, and when displacing the piston 5 toward the P1 direction. By making the reduction ratio by the reduction gear 17 different, it becomes possible to shorten the supply time of the liquid L to the liquid retention section 41.

Embodiment 6

Then, a liquid spray device 1F according to Embodiment 6 as the liquid spray device 1 will be described with reference to FIG. 13. It should be noted that in FIG. 13, constituents common to the present embodiment and Embodiment 1 through Embodiment 5 described above are denoted by the same reference numerals, and the detailed description thereof will be omitted. Here, the liquid spray device 1F according to the present embodiment has substantially the same features as those of the liquid spray device 1A according to Embodiment 1 described above except the following descriptions.

Figure 13:
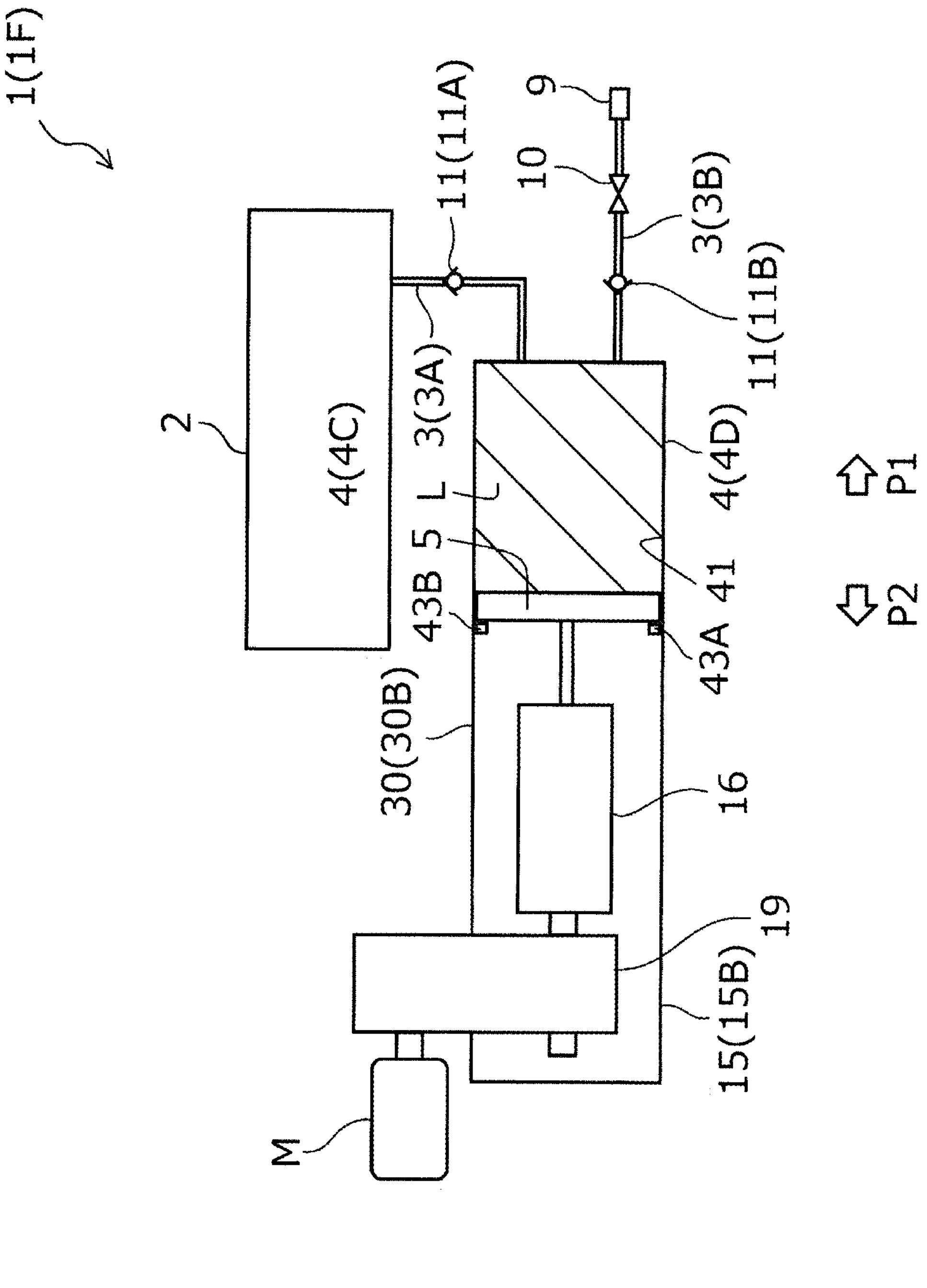
FIG. 13 is a schematic diagram of a liquid spray device according to Embodiment 6 of the present disclosure.

As shown in FIG. 13, the liquid spray device 1F according to the present embodiment is provided with a case 30B as the case 30 in which a cylinder 4D as the cylinder 4 and a part of a drive unit 15B as the drive unit 15 are integrally configured. The drive unit 15B is provided with the ball screw 16 to be coupled to the piston 5, the motor M, and a constant load spring 19 to be coupled to the motor M. Since the constant load spring 19 is capable of applying a constant force, the liquid spray device 1F according to the present embodiment is capable of displacing the piston 5 with the constant force due to such a configuration. In other words, it is possible to deliver the liquid L corresponding to one stroke with substantially constant pressure from the liquid tank 2 to the spray nozzle 9. It should be noted that the liquid spray device 1F according to the present embodiment and the liquid spray device 1E according to Embodiment 5 are each provided with the motor M, the ball screw 16, and so on as the displacing section, but the displacing section is not particularly limited, and it is possible to adopt the motor M, the ball screw 16, and so on in, for example, the liquid spray device 1 according to any one of Embodiment 1 through Embodiment 4, and it is possible to adopt the displacing section other than the motor M, the ball screw 16, and so on in the liquid spray device 1F according to the present practical example and the liquid spray device 1E according to Embodiment 5.

Embodiment 7

Then, a liquid spray device 1G according to Embodiment 7 as the liquid spray device 1 will be described with reference to FIG. 14. It should be noted that in FIG. 14, constituents common to the present practical example and Embodiment 1 through Embodiment 6 described above are denoted by the same reference numerals, and the detailed description thereof will be omitted. Here, the liquid spray device 1G according to the present embodiment has substantially the same features as those of the liquid spray device 1A according to Embodiment 1 described above except the following descriptions.

Figure 14:
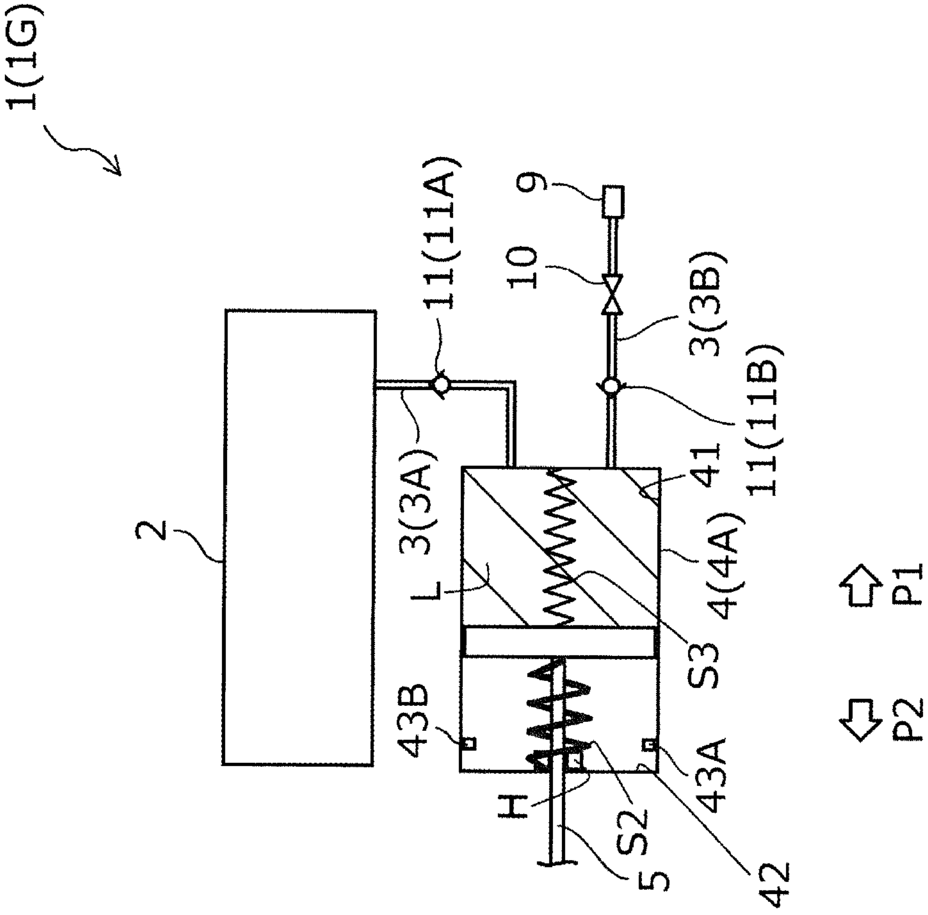
FIG. 14 is a schematic diagram of a liquid spray device according to Embodiment 7 of the present disclosure.

As shown in FIG. 14, the liquid spray device 1G according to the present embodiment has substantially the same cylinder 4A as in the liquid spray device 1A according to Embodiment 1, wherein the gas retention section 42 is provided with a heater H and a coil spring S2 which is made of a shape-memory alloy, and which exerts a strong force in a spreading direction when heated, and the liquid retention section 41 is provided with a coil spring S3 which exerts a weak force in a spreading direction. Due to such a configuration, the liquid spray device 1G according to the present embodiment is capable of setting the heater H to the OFF state to displace the piston 5 toward the P2 direction with the constant force caused by the coil spring S3 when supplying the liquid retention section 41 with the liquid L, and setting the heater H to the ON state to displace the piston 5 toward the P1 direction with the constant force caused by the coil spring S2 when delivering the liquid L from the liquid retention section 41 to the spray nozzle 9. In other words, it is possible to deliver the liquid L corresponding to one stroke with substantially constant pressure from the liquid tank 2 to the spray nozzle 9.

It should be noted that the liquid spray device 1G according to the present embodiment has the configuration in which the coil spring S3 is provided, and it is possible to displace the piston 5 toward the P2 direction with the force caused by the coil spring S3, but can be provided with a configuration in which the piston 5 is displaced toward the P2 direction manually or with electric power. Further, the liquid spray device 1G according to the present embodiment has the configuration in which the heater H is provided, and the coil spring S2 made of the shape-memory alloy is displaced with the heat generated by the heater H, but can be provided with a configuration in which the coil spring S2 made of the shape-memory alloy is displaced with the body heat transferred from a hand of the user.

Embodiment 8

Then, a liquid spray device 1H according to Embodiment 8 as the liquid spray device 1 will be described with reference to FIG. 15. It should be noted that in FIG. 15, constituents common to the present embodiment and Embodiment 1 through Embodiment 7 described above are denoted by the same reference numerals, and the detailed description thereof will be omitted. Here, the liquid spray device 1H according to the present embodiment has substantially the same features as those of the liquid spray device 1A according to Embodiment 1 described above except the following descriptions.

Figure 15:
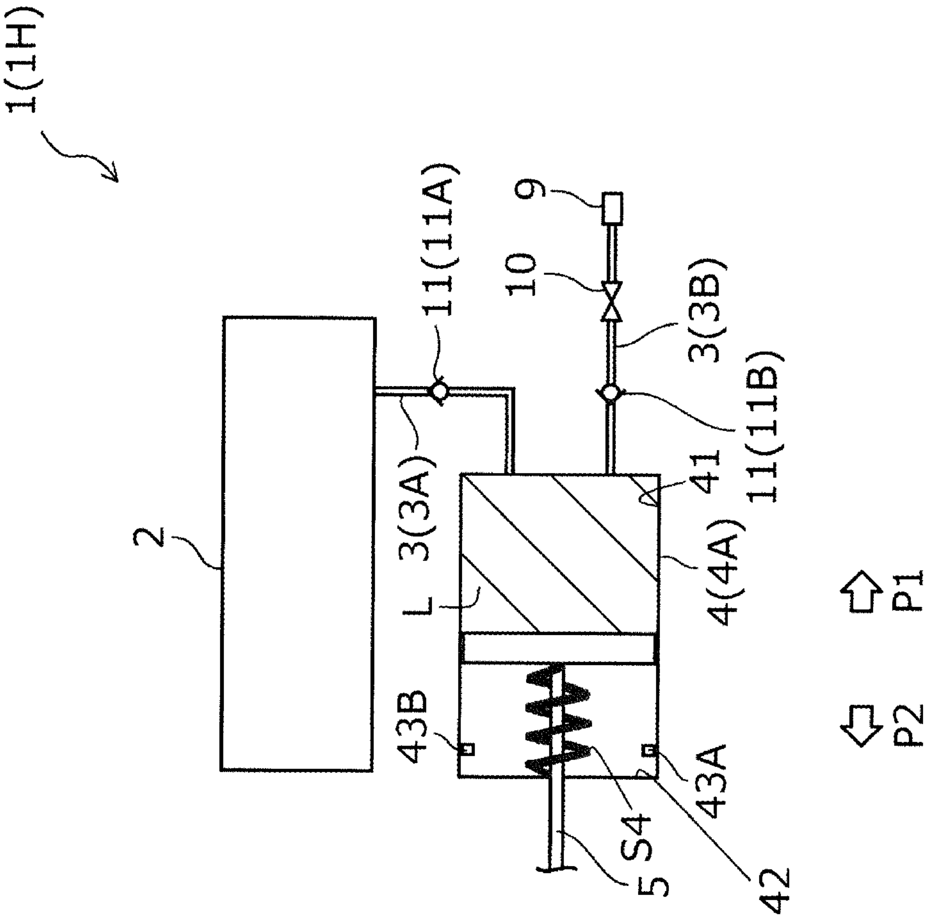
FIG. 15 is a schematic diagram of a liquid spray device according to Embodiment 8 of the present disclosure.

As shown in FIG. 15, the liquid spray device 1H according to the present embodiment has substantially the same cylinder 4A as in the liquid spray device 1A according to Embodiment 1, and the gas retention section 42 is provided with a coil spring S4 which is a super elastic spring, and which exerts a strong force in a spreading direction. Due to such a configuration, in the liquid spray device 1H according to the present embodiment, it is possible for the user to manually displace the piston 5 toward the P2 direction when supplying the liquid retention section 41 with the liquid L, and release the hand from the piston 5 to displace the piston 5 toward the P1 direction with the constant force caused by the coil spring S4 when delivering the liquid L from the liquid retention section 41 to the spray nozzle 9. In other words, it is possible to deliver the liquid L corresponding to one stroke with substantially constant pressure from the liquid tank 2 to the spray nozzle 9. It should be noted that it is possible to adopt a configuration in which the piston 5 is displaced toward the P2 direction with the electric power when supplying the liquid L to the liquid retention section 41 instead of adopting the configuration in which the user manually displace the piston 5 toward the P2 direction.

Embodiment 9

Then, a liquid spray device 1I according to Embodiment 9 as the liquid spray device 1 will be described with reference to FIG. 16. It should be noted that in FIG. 16, constituents common to the present embodiment and Embodiment 1 through Embodiment 8 described above are denoted by the same reference numerals, and the detailed description thereof will be omitted. Here, the liquid spray device 1I according to the present embodiment has substantially the same features as those of the liquid spray device 1A according to Embodiment 1 described above except the following descriptions.

Figure 16:
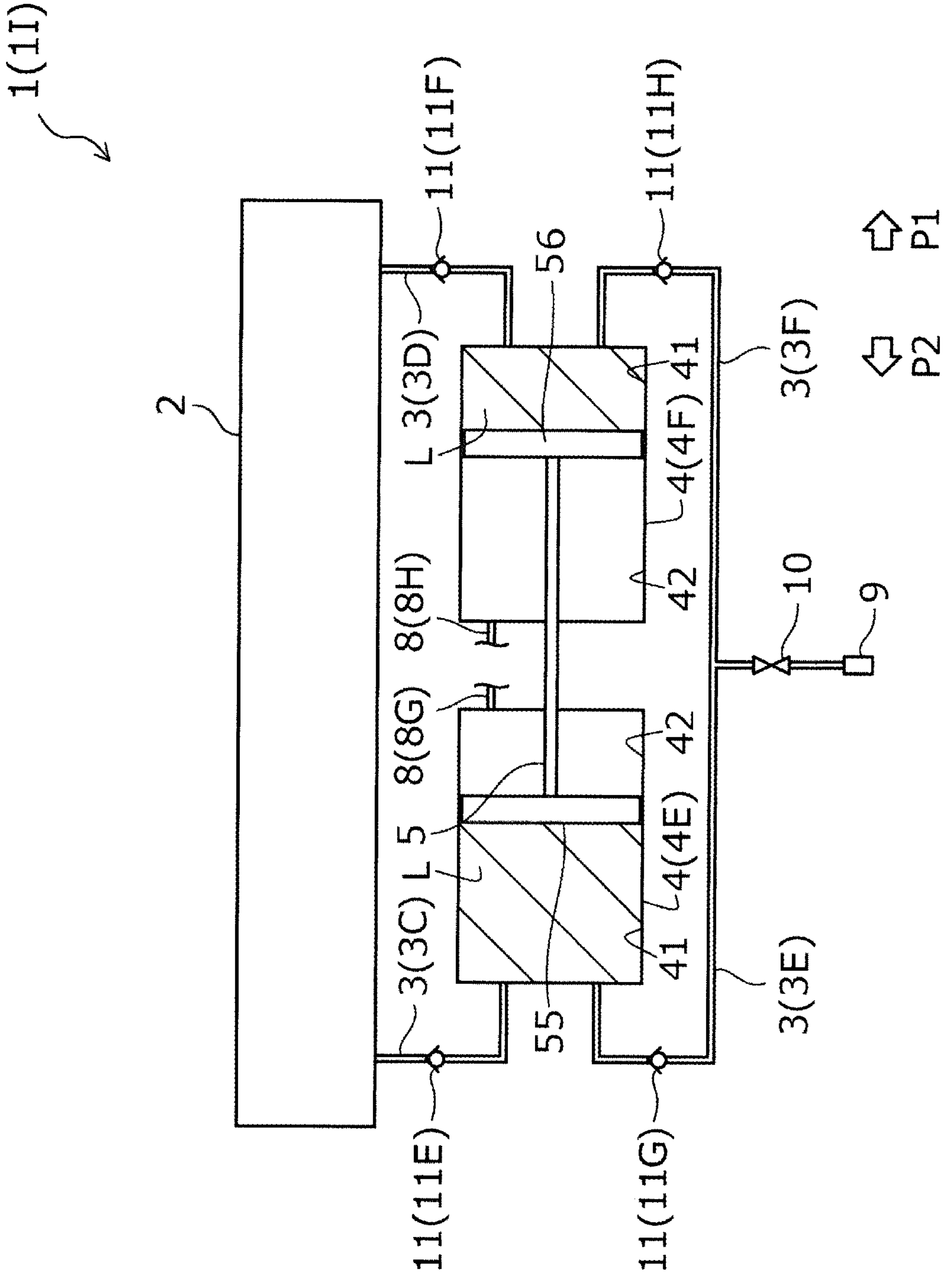
FIG. 16 is a schematic diagram of a liquid spray device according to Embodiment 9 of the present disclosure.

As shown in FIG. 16, the liquid spray device 1I according to the present embodiment is provided with a cylinder 4E and a cylinder 4F arranged in series as the cylinder 4, and the piston 5 inserted into both of the cylinder 4E and the cylinder 4F. Further, in the cylinder 4E, the liquid retention section 41 is provided with a liquid flow channel 3C provided with a check valve 11E, and a liquid flow channel 3E provided with a check valve 11G, and the gas retention section 42 is provided with a gas flow channel 8G. Further, in the cylinder 4F, the liquid retention section 41 is provided with a liquid flow channel 3D provided with a check valve 11F, and a liquid flow channel 3F provided with a check valve 11H, and the gas retention section 42 is provided with a gas flow channel 8H. Further, the liquid flow channel 3E and the liquid flow channel 3F merge with each other, and are coupled to the spray nozzle 9 via the opening and closing valve 10.

As described above, the liquid spray device 1I according to the present embodiment has a first liquid retention section and a second liquid retention section arranged in series as the liquid retention section 41, wherein the first liquid retention section is the liquid retention section 41 in the cylinder 4E, and the second liquid retention section is the liquid retention section 41 in the cylinder 4F. Further, the piston 5 has a configuration capable of changing the volume of the liquid retention section 41 in the cylinder 4E with a first zoning part 55, and at the same time changing the volume of the liquid retention section 41 in the cylinder 4F with a second zoning part 56.

The liquid spray device 1I according to the present embodiment has such a configuration, and is therefore capable of performing supply of the liquid L to the liquid retention section 41 in the cylinder 4E and discharge of the liquid L from the liquid retention section 41 in the cylinder 4F at the same time, and performing supply of the liquid L to the liquid retention section 41 in the cylinder 4F and discharge of the liquid L from the liquid retention section 41 in the cylinder 4E at the same time, and thus, the efficiency in delivering the liquid L is increased. Further, by adopting such a configuration, it is achieved to make the preparation of a plurality of the pistons 5 unnecessary, and it is achieved to make the synchronization of the plurality of pistons 5 unnecessary to thereby make the drive control of the piston 5 easy.

Embodiment 10

Then, a liquid spray device 1J according to Embodiment 10 as the liquid spray device 1 will be described with reference to FIG. 17. It should be noted that in FIG. 17, constituents common to the present embodiment and Embodiment 1 through Embodiment 9 described above are denoted by the same reference numerals, and the detailed description thereof will be omitted. Here, the liquid spray device 1J according to the present embodiment has substantially the same features as those of the liquid spray device 1A according to Embodiment 1 described above except the following descriptions.

Figure 17:
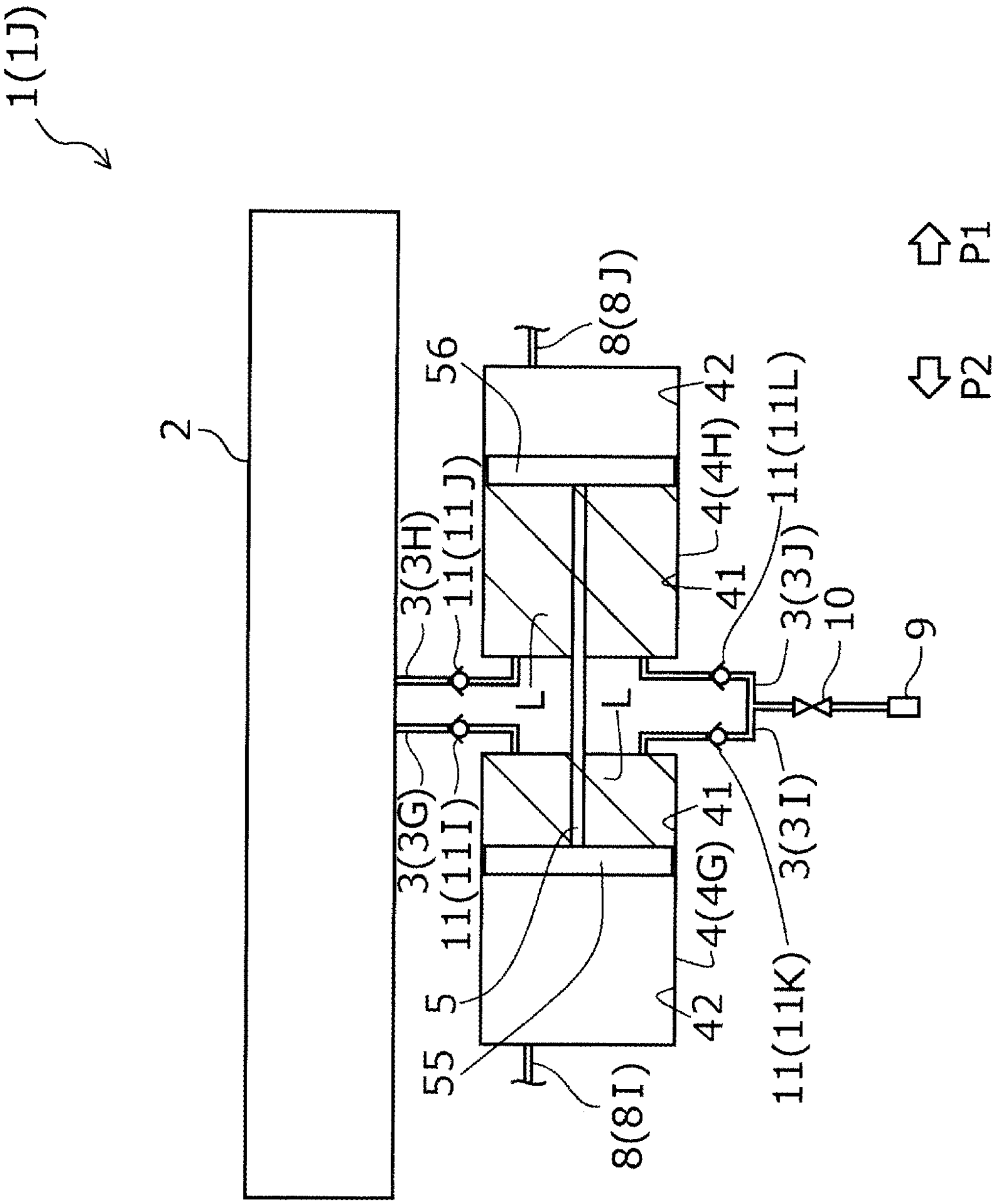
FIG. 17 is a schematic diagram of a liquid spray device according to Embodiment 10 of the present disclosure.

As shown in FIG. 17, the liquid spray device 1J according to the present embodiment is provided with a cylinder 4G and a cylinder 4H arranged in series as the cylinder 4, and the piston 5 inserted into both of the cylinder 4G and the cylinder 4H. Further, in the cylinder 4G, the liquid retention section 41 is provided with a liquid flow channel 3G provided with a check valve 11I, and a liquid flow channel 3I provided with a check valve 11K, and the gas retention section 42 is provided with a gas flow channel 8I. Further, in the cylinder 4H, the liquid retention section 41 is provided with a liquid flow channel 3H provided with a check valve 11J, and a liquid flow channel 3J provided with a check valve 11L, and the gas retention section 42 is provided with a gas flow channel 8J. Further, the liquid flow channel 3I and the liquid flow channel 3J merge with each other, and are coupled to the spray nozzle 9 via the opening and closing valve 10.

Therefore, it is possible to assume that the liquid spray device 1J according to the present embodiment has the configuration obtained by just exchanging the inside and the outside of the arrangement of the cylinder 4 in the liquid spray device 1I according to Embodiment 9 for each other. Therefore, there are provided substantially the same technical features and advantages as in the liquid spray device 1I according to Embodiment 9.

Embodiment 11

Then, a liquid spray device 1K according to Embodiment 11 as the liquid spray device 1 will be described with reference to FIG. 18. It should be noted that in FIG. 18, constituents common to the present embodiment and Embodiment 1 through Embodiment 10 described above are denoted by the same reference numerals, and the detailed description thereof will be omitted. Here, the liquid spray device 1K according to the present embodiment has substantially the same features as those of the liquid spray device 1A according to Embodiment 1 described above except the following descriptions.

Figure 18:
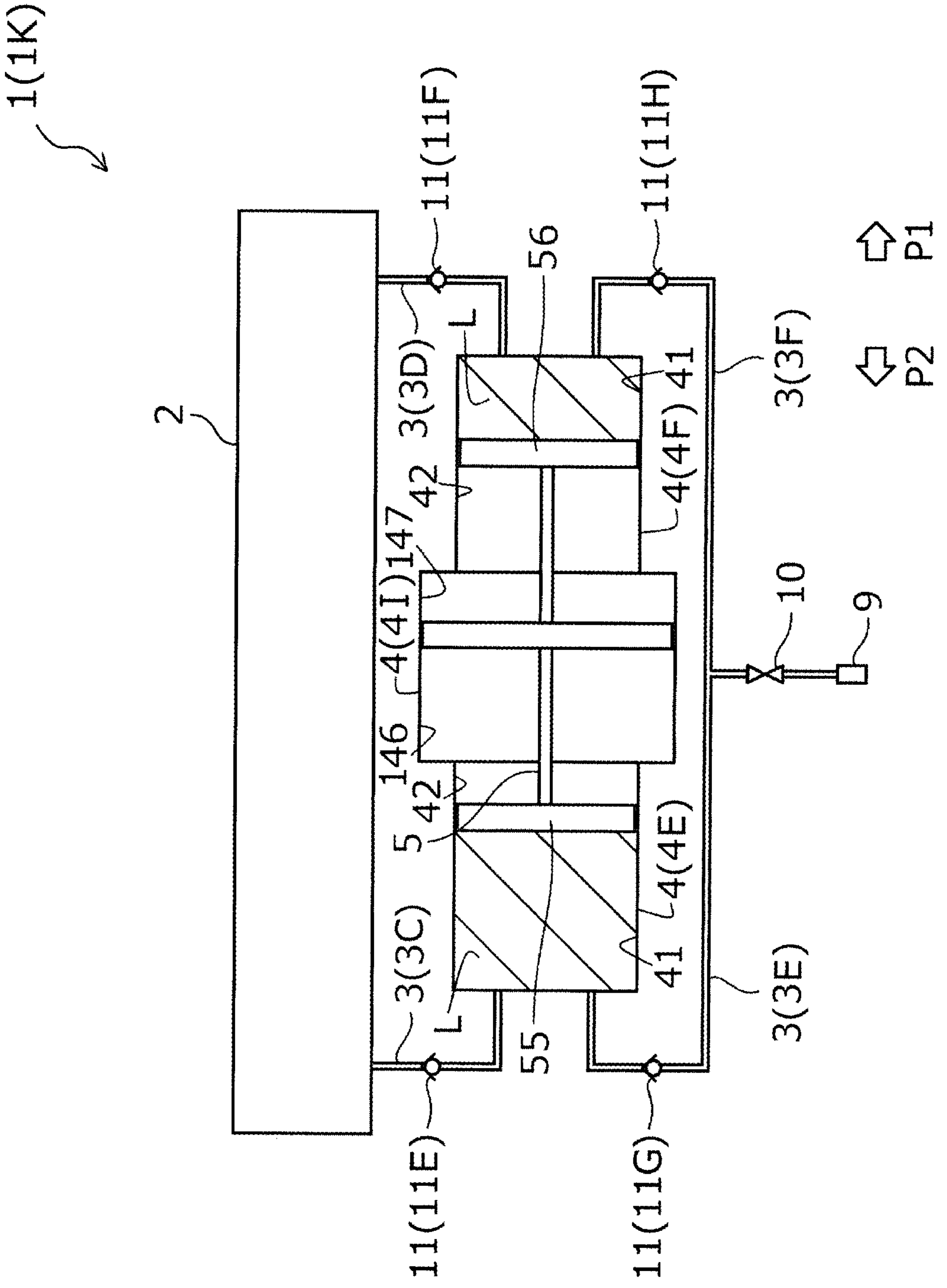
FIG. 18 is a schematic diagram of a liquid spray device according to Embodiment 11 of the present disclosure.

As shown in FIG. 18, the liquid spray device 1K according to the present embodiment has a configuration in which a cylinder 4I is provided between the cylinder 4E and the cylinder 4F in addition to the configuration of the liquid spray device 1I according to Embodiment 9, and the inside of the cylinder 4I is zoned by the piston 5 into a first gas retention section 146 and a second gas retention section 147. The liquid spray device 1K according to the present embodiment has a configuration capable of supplying the gas to the first gas retention section 146 and the second gas retention section 147 from a gas flow channel not shown, and since such a configuration is adopted, it is possible to displace the piston 5 in substantially the same manner as in the liquid spray device 11 according to Embodiment 9. Therefore, the liquid spray device 1K according to the present embodiment has substantially the same technical features and advantages as in the liquid spray device 1I according to Embodiment 9.

Embodiment 12

Then, a liquid spray device 1L according to Embodiment 12 as the liquid spray device 1 will be described with reference to FIG. 19. It should be noted that in FIG. 19, constituents common to the present embodiment and Embodiment 1 through Embodiment 11 described above are denoted by the same reference numerals, and the detailed description thereof will be omitted. Here, the liquid spray device 1L according to the present embodiment has substantially the same features as those of the liquid spray device 1A according to Embodiment 1 described above except the following descriptions.

Figure 19:
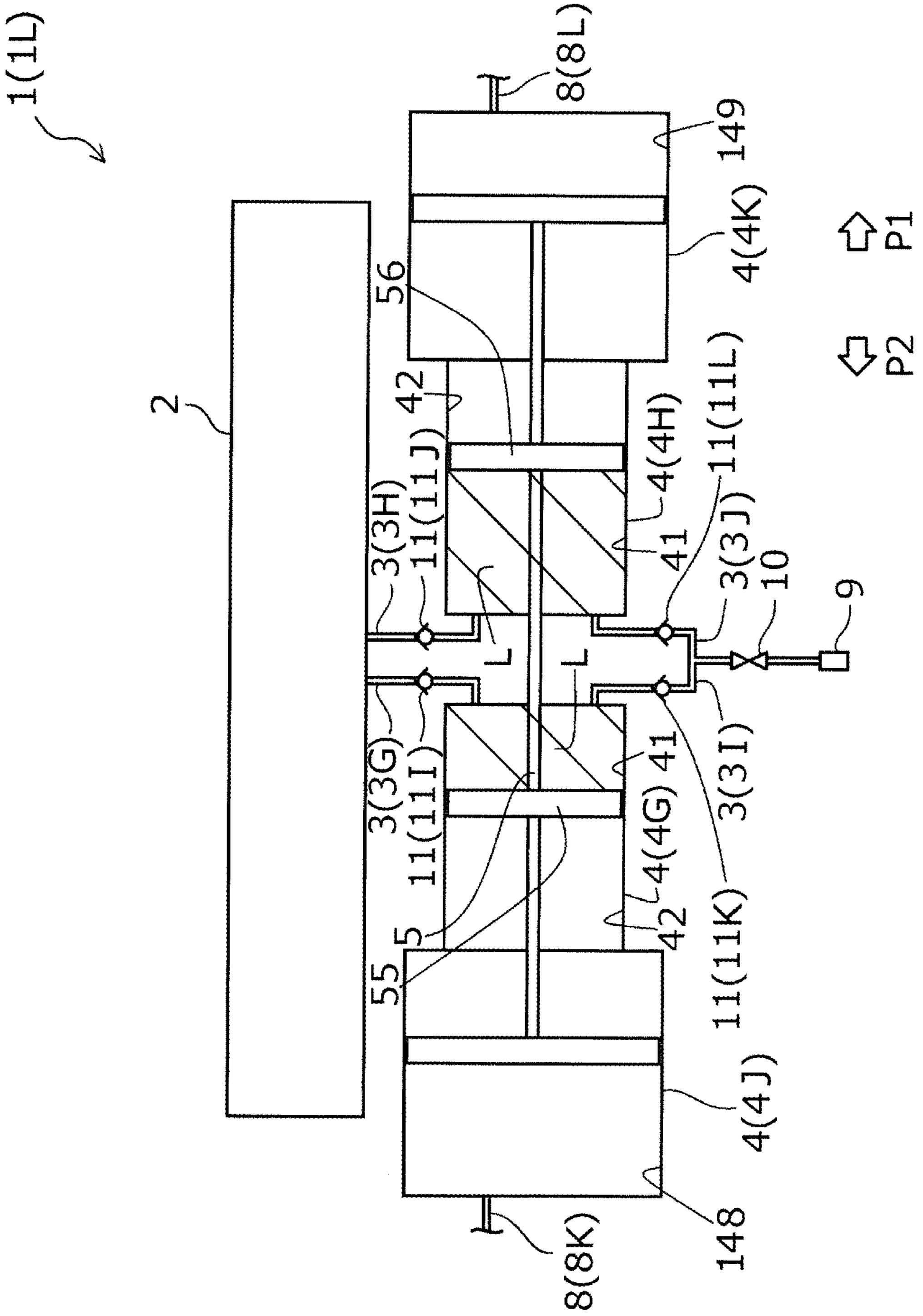
FIG. 19 is a schematic diagram of a liquid spray device according to Embodiment 12 of the present disclosure.

As shown in FIG. 19, the liquid spray device 1L according to the present embodiment is provided with a cylinder 4J at an outer side of the cylinder 4G, and is at the same time provided with a cylinder 4K at an outer side of the cylinder 4H in addition to the configuration of the liquid spray device 1J according to Embodiment 10, wherein the piston 5 reaches the cylinder 4K from the cylinder 4J. Further, the cylinder 4J has a gas retention section 48 coupled to a gas flow channel 8K, and the cylinder 4K has a gas retention section 49 coupled to a gas flow channel 8L. The liquid spray device 1L according to the present embodiment is provided with a configuration capable of supplying the gas to a gas retention section 148 and a gas retention section 149 from the gas flow channel 8K and the gas flow channel 8L, respectively, and is characterized in the configuration in which the cylinders 4J, 4K are different in cylinder diameter from the cylinders 4G, 4H, respectively. Since there is adopted such a configuration, it is possible to displace the piston 5 in substantially the same manner as in the liquid spray device 1J according to Embodiment 10, and at the same time, it is possible to make the pressure in the gas flow channel and the pressure in the liquid delivery section different from each other in accordance with a diametrical ratio between the cylinders. Therefore, the liquid spray device 1L according to the present embodiment has substantially the same technical features and advantages as in the liquid spray device 1J according to Embodiment 10. By making the cylinder diameters at the side of supplying the gas and at the side of supplying the liquid L different from each other as described above, it is possible to deliver the liquid with the pressure higher or lower than the gas pressure.

The present disclosure is not limited to the embodiments described above, but can be implemented with a variety of configurations within the scope or the spirit of the present disclosure. The technical features in the embodiments corresponding to the technical features in the aspects described in SUMMARY section can appropriately be replaced or combined in order to solve all or a part of the problems described above, or in order to achieve all or a part of the advantages. For example, it is possible to adopt a configuration provided with two two-way valves instead of the three-way valve 12. Further, the technical feature can arbitrarily be eliminated unless described in the present specification as an essential element.

What is claimed is:

1. A liquid delivery device, comprising:

a cylinder having a liquid retention section configured to retain a liquid;

a piston in the cylinder, wherein the piston is configured to:

change a volume of the liquid retention section; and stop the change in the volume when the volume of the liquid retention section reaches a first predetermined volume;

a plurality of regulation sections in the cylinder, wherein the plurality of regulation sections is configured to:

stop movement of the piston at a first position in a case where the liquid is supplied to the liquid retention section; and stop the movement of the piston at a second position in a case where the liquid retention section becomes to have a second predetermined volume;

a gas container configured to encapsulate a gas at pressure exceeding atmospheric pressure;

a regulator which is coupled to the gas container, wherein the regulator is configured to adjust pressure of the gas delivered from the gas container;

a gas flow channel having a supply flow channel configured to supply the gas delivered from the regulator to the piston, and a release-to-atmosphere flow channel configured to release the gas delivered from the regulator to an atmosphere; and a three-way valve which is provided to the gas flow channel, wherein the three-way valve is configured to switch between a first state in which the gas delivered from the regulator is delivered to the supply flow channel, and a second state in which the gas delivered from the regulator is delivered to the release-to-atmosphere flow channel, the supply flow channel includes a first gas flow channel between the regulator and the three-way valve, and a second gas flow channel between the three-way valve and the cylinder in the first state, and the release-to-atmosphere flow channel includes the second gas flow channel between the three-way valve and the cylinder, and a third gas flow channel between the three-way valve and the atmosphere in the second state.

2. The liquid delivery device according to claim 1, further comprising:

an inflow port through which the liquid inflows into the liquid retention section; and an outflow port through which the liquid outflows from the liquid retention section.

3. The liquid delivery device according to claim 1, wherein the regulator is adjusted so that a volume change rate of the liquid retention section is equal to or less than 100 mL/min.

4. The liquid delivery device according to claim 1, wherein the liquid retention section includes a first liquid retention section and a second retention section arranged in series, and the piston changes a volume of the first liquid retention section with a first zoning part, and changes a volume of the second retention section with a second zoning part.

5. The liquid delivery device according to claim 1, wherein the cylinder has the liquid retention section and a gas retention section configured to retain the gas delivered from the gas container, the piston changes a volume of the gas retention section together with the volume of the liquid retention section, and the liquid retention section in the cylinder and the gas retention section in the cylinder are different in diameter from each other.

6. A liquid spray device, comprising:

the liquid delivery device according to claim 1; and a spray nozzle configured to spray the liquid delivered from the liquid delivery device.

7. The liquid spray device according to claim 6, wherein the liquid is delivered to the spray nozzle as a continuous flow, and the continuous flow is changed into a droplet and then ejected by the spray nozzle.

8. The liquid spray device according to claim 7, wherein a droplet diameter of the droplet is no smaller than 20 μm, and an ejection speed of the droplet is no higher than 300 m/s.

9. The liquid delivery device according to claim 1, wherein the plurality of regulation sections is spaced apart from a wall part of the cylinder.

* * * * *